United States Patent
Kurihara et al.

(10) Patent No.: US 7,738,070 B2
(45) Date of Patent: *Jun. 15, 2010

(54) LIQUID CRYSTAL DISPLAY ELEMENT

(75) Inventors: Takashi Kurihara, Yokohama (JP); Yasuhiro Kume, Kawachinagano (JP); Kazuhiko Tamai, Nabari (JP); Takaaki Okamoto, Kizugawa (JP); Shinya Saeki, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 183 days.

This patent is subject to a terminal disclaimer.

(21) Appl. No.: 11/991,793

(22) PCT Filed: Sep. 12, 2006

(86) PCT No.: PCT/JP2006/318078

§ 371 (c)(1), (2), (4) Date: Mar. 11, 2008

(87) PCT Pub. No.: WO2007/032356

PCT Pub. Date: Mar. 22, 2007

(65) Prior Publication Data
US 2009/0115958 A1    May 7, 2009

(30) Foreign Application Priority Data
Sep. 16, 2005 (JP) .............................. 2005-271237

(51) Int. Cl.
*C09K 19/02* (2006.01)
*G02F 1/141* (2006.01)

(52) U.S. Cl. .................... 349/186; 349/136; 349/179; 349/180

(58) Field of Classification Search ...................... None
See application file for complete search history.

(56) References Cited

U.S. PATENT DOCUMENTS

| 6,141,075 A | 10/2000 | Ohmuro et al. |
| 2009/0147199 A1* | 6/2009 | Kume et al. ............... 349/126 |

FOREIGN PATENT DOCUMENTS

| JP | 09-005754 | 1/1997 |
| JP | 09-090434 | 4/1997 |
| JP | 10-123576 | 5/1998 |
| JP | 2001-042332 | 2/2001 |
| JP | 2001-264770 | 9/2001 |
| JP | 2001-343652 | 12/2001 |
| JP | 2003-149645 | 5/2003 |
| JP | 2003-255395 | 9/2003 |
| JP | 2005-181826 | 7/2005 |
| JP | 2005-234254 | 9/2005 |

OTHER PUBLICATIONS

International Search Report for PCT/JP2006/318078 mailed Nov. 7, 2006.
U.S. Appl. No. 11/991,906, filed Mar. 12, 2008, entitled "Liquid Crystal Display Element".
Takahashi et a., "Electrooptical Properties of Vertically Aligned Twisted Nematic Cells with Negative Dielectric Anisotropy," *Jpn. J. Appl. Phys.*, vol. 36, Part 1, No. 6A, (1997), pp. 3531-3536.

* cited by examiner

*Primary Examiner*—Tina M Wong
(74) *Attorney, Agent, or Firm*—Nixon & Vanderhye, P.C.

(57) ABSTRACT

A liquid crystal display element of the present invention is arranged so that a material layer having dielectric anisotropy includes a chiral material and a liquid crystal material with a nematic liquid crystal phase, and $0.25 \leq d/p \leq 0.50$ is satisfied assuming that the thickness of the material layer is d and the chiral pitch length of the liquid crystal material is p.

16 Claims, 10 Drawing Sheets

LIQUID CRYSTAL DISPLAY ELEMENT

This application is the U.S. national phase of International Application No. PCT/JP2006/318078, filed 12 Sep. 2006, which designated the U.S. and claims priority to Japanese Patent Application No. 2005-271237, filed 16 Sep. 2005, the entire contents of each of which are hereby incorporated by reference.

TECHNICAL FIELD

The present invention relates to a liquid crystal display element which operates in a vertical alignment mode.

BACKGROUND ART

The advance of liquid crystal displays (LCDs) of recent date has been remarkable. LCDs have been widely used for small displays of mobile equipments, PC monitors, liquid crystal television receivers, and so on. As liquid crystal displays advance, demands for quicker response and higher contrast are increasing.

There are many types of liquid crystal display modes. Among them, a mode which primarily assures high contrast is the vertical alignment mode using liquid crystal with negative dielectric anisotropy. Under crossed nicols, in a liquid crystal display in the vertical alignment mode, the longitudinal axis direction of liquid crystal molecules sandwiched between a pair of substrates is orthogonal to the substrates when no electric field is applied. The liquid crystal display is therefore in dark state. On the other hand, when an electric field orthogonal to the substrates is applied, the longitudinal axis direction of the liquid crystal molecules falls from the direction orthogonal to the substrates to the direction in parallel to the substrates. The liquid crystal display therefore becomes in bright state.

An alignment film used in the vertical alignment mode is a vertical alignment film which arranges the longitudinal axis direction of the liquid crystal molecules to be substantially orthogonal to the substrates when no electric field is applied. The vertical alignment film, however, typically cannot control the direction of tilt of the liquid crystal molecules when an electric field is applied. If no countermeasure is taken, the liquid crystal molecules fall in random directions when an electric field is applied, and the brightness is impaired due to the occurrence of disclination. To solve this problem, various measures have conventionally been taken. Examples of the measures are as follows: a structure is provided between a pair of substrates so that the direction to which liquid crystal molecules falls in response to voltage application is regulated; a chiral material is added so that, in response to voltage application, liquid crystal molecules are arranged to fall while being twisted in a predetermined direction; and the vertical alignment film is rubbed so that the direction in which the liquid crystal molecules fall in response to electric field application is controlled.

As one type of the vertical alignment mode, there is a twisted vertical alignment mode in which, when a voltage is applied, liquid crystal molecules are twisted (i.e. the alignment vector of the liquid crystal molecules in proximity to one substrate is different from the alignment vector of the liquid crystal molecules in proximity to the other substrate). The alignment directions of the liquid crystal molecules, for example, form an angle of 90° between the respective substrates.

Patent Document 1 discloses (i) a rubbing device which can reduce defective alignment which is caused in a process of manufacturing a so-called vertical-alignment-mode liquid crystal display element in which a liquid crystal material with negative dielectric anisotropy is injected into a homeotropic-alignment (vertical alignment) cell, and which occurs when the vertical alignment film of the liquid crystal display element is rubbed, and (ii) a liquid crystal display element manufactured by using the rubbing device.

Patent Document 2 relates to a liquid crystal display element which operates in a so-called vertical alignment mode in which liquid crystal with negative dielectric anisotropy is substantially vertically aligned with respect to the panel surface of the liquid crystal display element, and discloses a vertical-alignment-mode liquid crystal display element whose response speed, viewing angle, and contrast are optimized.

Patent Document 3 discloses a so-called vertically aligned twisted nematic liquid crystal display element which operates in a vertical alignment mode in which liquid crystal with negative dielectric anisotropy is substantially vertically aligned with respect to the panel surface of the liquid crystal display element, and in which the liquid crystal molecules are twisted in response to voltage application to the liquid crystal layer. Being combined with a phase compensation panel or the like, this liquid crystal display element is advantageous in high visibility due to bright and achromatic background color, high contrast, wide viewing angle, and quick response.

Patent Document 4 discloses a so-called vertically aligned twisted nematic liquid crystal display element. This liquid crystal display element operates in the vertical alignment mode in which liquid crystal with negative dielectric anisotropy is aligned to be substantially orthogonal to the panel surface of a liquid crystal display element, and this liquid crystal display element excels in viewing angle.

[Patent Document 1]
Japanese Laid-Open Patent Application No. 2003-149645 (published on May 21, 2003)

[Patent Document 2]
Japanese Laid-Open Patent Application No. 10-123576 (published on May 15, 1998)

[Patent Document 3]
Japanese Laid-Open Patent Application No. 9-90434 (published on Apr. 4, 1997)

[Patent Document 4]
Japanese Laid-Open Patent Application No. 9-5754 (published on Jan. 10, 1997)

SUMMARY

However, in case where an alignment film of a display in a vertical alignment mode such as a twisted vertical alignment mode is in uniaxial alignment (e.g. the alignment film has been rubbed), liquid crystal molecules around the substrate are aligned so as to be slightly tilted from the direction orthogonal to the substrate. Also, on the surface of the substrate on the whole, the tilting angles (pre-tilt angles) of the liquid crystal molecules with respect to the plane of the substrate are different from one another to some extent.

In other words, when the alignment film is in uniaxial alignment, the surface of the alignment film is not uniform and completely in uniaxial alignment in its entirety but is irregular to some extent. Therefore, when liquid crystal molecules are sandwiched between two substrates on which the above-described alignment films are provided, respectively, the pre-tilt angles of the liquid crystal molecules with respect to the surfaces of the substrates are different to some extent, in the entirety of the surfaces of the substrates.

Differences in the pre-tilt angles result in differences in the ways of falling of the liquid crystal molecules in response to voltage application. When the ways of falling of the liquid crystal molecules in response to voltage application are different, the retardation of the liquid crystal layer is inconsistent. Such inconsistency in the retardation of the liquid crystal layer induces inconsistency in an amount of light passing through the liquid crystal display element. Consequently, differences in the pre-tilt angles result in inconsistency in an amount of light passing through the liquid crystal display element.

To put it differently, in liquid crystal molecules sandwiched between two substrates on which uniaxial-aligning alignment films are provided so as to face each other, the pre-tilt angles of the liquid crystal molecules are different and such differences in the pre-tilt angles (inconsistency in the tilt of the alignment films) induce inconsistency in an amount of light passing through the liquid crystal display element. The inconsistency results in a variation in an amount of light passing through the surfaces of the substrates, thereby causing irregularity in image display.

For example, when the pre-tilt angles are dispersed in the range of about 3°, an amount of light passing through the liquid crystal display element varies in the range of about 60%. When the amount of the transmitted light varies in such a high degree, the variation induces irregularity in image display. The relationship between the dispersion in pre-tilt angles and an amount of transmitted light will be discussed. FIG. 9 is a graph of voltages (horizontal axis) and light transmittance (vertical axis) in a conventional liquid crystal display element, and shows how light transmission varies in response to voltage application, when 6 types of pre-tilt angles (87°, 87.5°, 88° 88.5°, 89°, and 89.5°) are used. As shown in FIG. 9, the light transmission is varied in accordance with a pre-tilt angle (particularly when the voltage is about 3 to 4 volts). The difference between the minimum and the maximum is about 60%. In other words, the figure illustrates that, on account of the inconsistency in the pre-tilt angles, an amount of transmitted light varies about 60% and hence irregularity in image display occurs.

There have been attempts to restrain irregularity in image display in a conventional liquid crystal display in the vertical alignment mode, by eliminating the irregularity in the pre-tilt angles, i.e. by arranging the liquid crystal molecules to be uniformly tilted with respect to the planes of the substrates. However, such attempts are hardly practicable because it is in reality difficult to eliminate the irregularity in the pre-tilt angles.

The technology disclosed herein solves the problem above and provides a liquid crystal display element in a vertical alignment mode, in which, under the condition of dispersed pretilt angles, display unevenness due to a variation in an amount of transmitted light caused by the dispersion of the pretilt angles is restrained.

To achieve the objective above, a liquid crystal display element of an example embodiment includes: a pair of opposing substrates; and a material layer which is sandwiched between said pair of substrates and has dielectric anisotropy, the material layer having the dielectric anisotropy including a chiral material and liquid crystal material with a nematic liquid crystal phase, and $0.25 \leq d/p \leq 0.50$ being satisfied assuming that the thickness of the material layer is d and the chiral pitch length of the liquid crystal material is p.

In the arrangement above, a material layer with dielectric anisotropy is sandwiched between a pair of opposing substrates. This material layer with dielectric anisotropy includes a chiral material and a liquid crystal material with a nematic liquid crystal phase. The chiral pitch length of the liquid crystal material can be varied by changing the amount of the chiral material.

In the aforesaid liquid crystal display element, $0.25 \leq d/p \leq 0.50$ is satisfied assuming that the thickness of the material layer is d and the chiral pitch length of the liquid crystal material is p.

In a conventional liquid crystal display element, due to the dispersion in pretilt angles, the direction of falling of the liquid crystal material in the liquid crystal layer is not uniform when a voltage is applied, and hence the retardation of the liquid crystal layer is inconsistent. As a result, an amount of light passing through the liquid crystal display element is uneven, thereby inducing display unevenness on account of the dispersion in the pretilt angles. A pretilt angle is an angle between the director of the liquid crystal material and the substrate surface when no voltage is applied. The director of the liquid crystal material is the average direction of the longitudinal axis of the liquid crystal material.

As in an example embodiment, the unevenness in an amount of transmitted light in the plane of the surface of the liquid crystal display element, which is caused by the dispersion in the pretilt angles, is restrained by adding a particular amount of the chiral material to the liquid crystal material and adjusting the chiral pitch length of the liquid crystal material. As a result of this, it is possible to obtain a liquid crystal display element which can display high-quality images without display unevenness.

The reason of the above will be discussed.

Two substrate having the respective alignment films having been uniaxial-aligned (e.g. rubbed) are disposed so that the uniaxial-alignment directions thereof are orthogonal to each other, and a liquid crystal material is sandwiched therebetween. When a voltage is applied to the liquid crystal layer, the liquid crystal material around the substrate boundary faces falls in the uniaxial-alignment directions of the alignment films. The substrate boundary face areas are areas around the boundary faces between the substrates and the liquid crystal layer, and in these areas liquid crystal material with pretilt angles exists.

From the substrate boundary face area of one of the two substrates sandwiching the liquid crystal layer to the substrate boundary surface area of the substrate opposing the aforesaid substrate, the liquid crystal molecules of the liquid crystal material are aligned while being successively twisted. The director of the liquid crystal material in the substrate boundary face area of said opposing substrate falls in the uniaxial-alignment direction of the alignment film on that opposing substrate.

As a result, the directors of the liquid crystal material are orthogonal to each other between the opposing substrate boundary surface areas. In this connection, the way of the twist of the director of the liquid crystal material depends on an amount of the chiral material in the liquid crystal layer.

The following will describe how the director of the liquid crystal material twists. FIGS. 7 and 8 are graphs showing the twist alignment of the director of the liquid crystal material. In other words, the graphs show the direction in which the liquid crystal material aligns when a voltage is applied, and show changes in the alignment direction of the director of the liquid crystal material, from the substrate boundary surface area to the opposing substrate boundary surface area of the liquid crystal display element.

In both FIGS. 7 and 8, the horizontal axis indicates /d which is a value figured out by standardizing the thickness direction (z direction) location of the liquid crystal display element by thickness (d), whereas the vertical axis indicates the azimuth of the liquid crystal director.

FIG. 7 relates to a liquid crystal display element in which p=60 (μm) and d=3.5 (μm), whereas FIG. 8 relates to a liquid crystal display element in which p=15 (μm) and d=4.5 (μm).

When an amount of the chiral material in the liquid crystal layer is small, as shown in FIG. 7, the director of the liquid crystal material around the substrate boundary face area rapidly twists. In other words, as shown in FIG. 7, the director of the liquid crystal material around the substrate boundary face area (around 0.0 or 1.0 in the z direction in FIG. 7) twists for about 20°-50° in response to even a slight change in the z direction.

On the other hand, when a predetermined amount of chiral material is added to the liquid crystal layer, as shown in FIG. 8, the way of the twist of the director of the liquid crystal material is gradual from one substrate boundary face area to the other substrate boundary face area. As shown in FIG. 8, the director of the liquid crystal material successively changes in the range of 0.0 to 1.0 in the z direction, and hence it is possible to understand that the direction of the twist alignment is gradually changed.

In this manner, it is possible to allow the alignment of the liquid crystal material to smoothly change in response to a change in electric field on the liquid crystal layer, by causing the director of the liquid crystal material in the liquid crystal layer to successively and gradually change from one substrate boundary face area to the other substrate boundary face area. In the technology disclosed herein, the arrangement above makes it possible to compensate a variation in the alignment of the liquid crystal material due to the dispersion in the pretilt angles, and hence a variation in an amount of transmitted light due to a variation in the alignment of the liquid crystal material is restrained.

In other words, in the technology disclosed herein, a suitable amount of chiral material is added to the liquid crystal layer so as to cause d/p to fall within the range of $0.25 \leq d/p \leq 0.50$, with the result that the twist of the director of the liquid crystal material in the liquid crystal layer successively and gradually changes. Therefore display unevenness due to the dispersion in the pretilt angles is restrained.

REFERENCE NUMERALS

1, 31 LIQUID CRYSTAL DISPLAY ELEMENT
2 FIRST SUBSTRATE (SUBSTRATE)
3 SECOND SUBSTRATE (SUBSTRATE)
4 LIQUID CRYSTAL LAYER (MATERIAL LAYER WITH DIELECTRIC ANISOTROPY, DIELECTRIC ANISOTROPY COMPOSITION LAYER)
7, 10, 34, 35 ALIGNMENT FILM (VERTICAL ALIGNMENT FILM)

DETAILED DESCRIPTION

Embodiment 1

Figure 1:
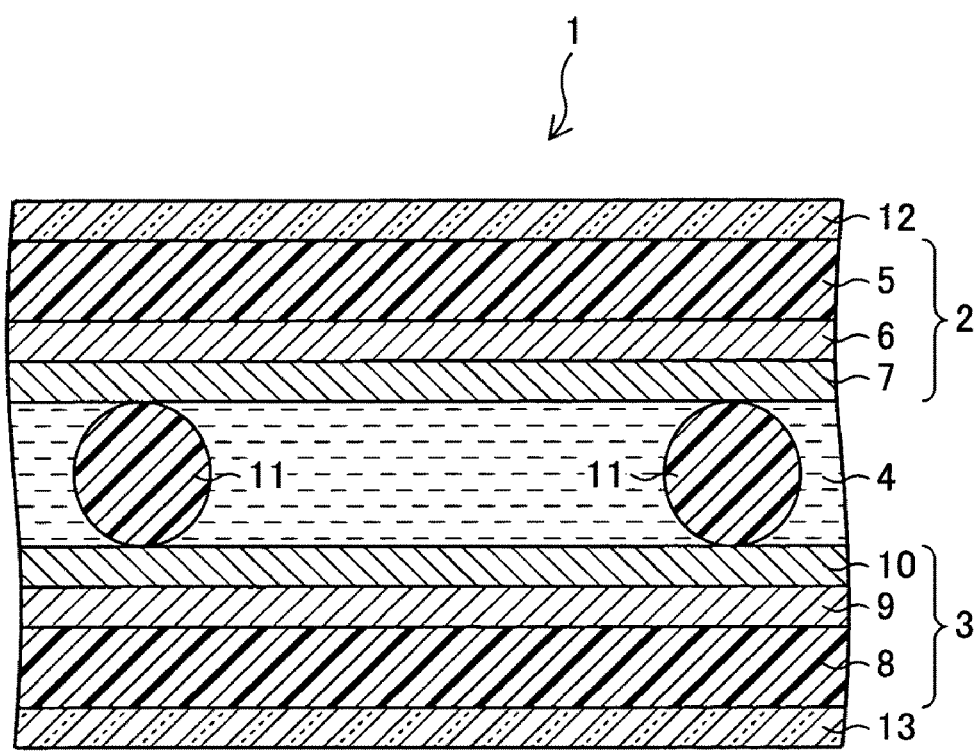
FIG. 1 relates to an example embodiment and is a cross section which outlines a liquid crystal display element.
Figure 2:
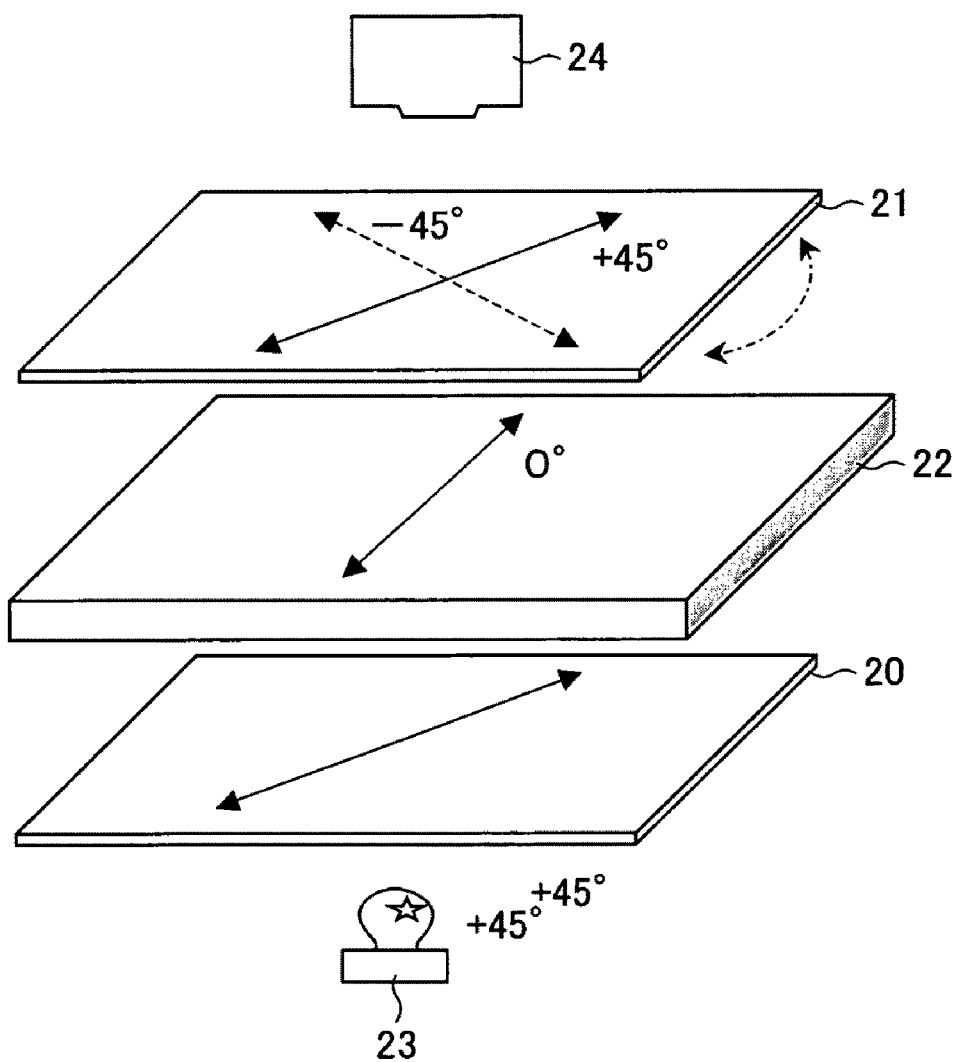
FIG. 2 relates to an example embodiment and shows a measurement by rotating analyzer.

The following will explain an example embodiment with reference to FIG. 1 and FIG. 2.

(Liquid Crystal Display Element Using Both-side Rubbing)

FIG. 1 is a cross section which outlines a liquid crystal display element 1 of the present example embodiment. As shown in FIG. 1, the liquid crystal display element (liquid crystal display cell) 1 of the present embodiment is provided with a pair of light-transmittin 0067 substrates (first substrate 2 and second substrate 3) facing each other. The liquid crystal display element 1 has a cell structure such that a liquid crystal layer (material layer having dielectric anisotropy) 4 is sandwiched between the pair of substrates (first substrate 2 and second substrate 3).

The first substrate 2 includes a planar light-transmitting substrate 5 made of a light-transmitting material such as grass, a transparent electrode 6, and an alignment film 7. Similarly, the second substrate 3 includes a planar light-transmitting substrate 8 made of a light-transmitting material such as grass, a transparent electrode 9, and an alignment film 10. The first substrate 2 and the second substrate 3 are jointed with a spacer 11 interposed therebetween, so as to form a single cell.

The transparent electrode 6 is provided on the surface of the light-transmitting substrate 5, which surface opposes the other light-transmitting substrate 8. The transparent electrode 9 is provided on the surface of the light-transmitting substrate 8, which surface opposes the other light-transmitting substrate 5. In short, the transparent electrode 6 and the transparent electrode 9 are disposed to oppose each other.

The transparent electrode 6 is formed on the light-transmitting substrate 5 in such a manner that a conductive film such as ITO (indium tin oxide) is formed by means of sputtering or the like, and patterning into an appropriate shape is carried out thereto by photolithography. Similarly, the transparent electrode 9 is formed by performing patterning to have an appropriated shape on the light-transmitting substrate 8.

The transparent electrode 6 and the transparent electrode 9 are provided so that pixels are formed at portions where the patterns of these electrodes overlap one another. In response to an electric potential supplied from the outside, an electric field is formed on the pixel part so that the liquid crystal molecules at the pixel part are switched.

The alignment films 7 and 10 control the alignment of the liquid crystal molecules (liquid crystal material) so that the longitudinal direction of the liquid crystal molecules to be orthogonal (i.e. in the direction closer to the orthogonal direction than the parallel direction) to the plane including the first substrate 2 and the plane including the second substrate 3. The alignment film 7 is provided so as to entirely cover the surface of the first substrate 2, on which surface the transparent electrode 6 is formed. The alignment film 10 is formed so as to entirely cover the surface of the second substrate 3, on which surface the transparent electrode 9 is formed. In short, the alignment film 7 and the alignment film 10 are provided so as to oppose one another, too.

The alignment film 7 and the alignment film 10 have been uniaxial-aligned (e.g. rubbed) in advance for the sake of determination of the direction of falling of liquid crystal molecules in response to electric field application. This arrangement in which both of the alignment films 7 and 10 provided on the first substrate 2 and the second substrate 3, respectively, are rubbed is termed both-side rubbing. In this rubbing arrangement, the rubbing direction of the alignment film 7 and the rubbing direction of the alignment film 10 are arranged to be substantially orthogonal to one another.

The alignment film 7 and the alignment film 10 may be organic films or inorganic films. Any types of films may be adopted on condition that the degree of the order of the alignment of the liquid crystal molecules is increased and the liquid crystal molecules are aligned in a desired direction. However, since good alignment is achieved when the alignment film 7 and the alignment film 10 are organic thin films, the alignment film 7 and the alignment film 10 are preferably organic thin films. Among organic thin films, polyimide is preferable because it excels in stability and reliability and allows for extremely good alignment. The alignment film 7 and the alignment film 10 may be commercially-available vertical alignment films, such as RN-783 (product name) of Nissan Chemical Industries, Ltd. and JALS-203 (product name) of JSR Corporation.

The spacer 11 may be Micropearl (product name) of Sekisui Chemical Co. Ltd. On the outer sides of the first substrate 2 and the second substrate 3, i.e. on the surfaces opposite to the opposing surfaces of the first substrate 2 and the second substrate 3, polarizing plates 12 and 13 are provided, respectively. Each of the polarizing plates 12 and 13 are disposed so that the polarization axis thereof is in parallel to the direction (rubbing direction) of the rubbing of the alignment film which is closer to that polarizing plate.

The liquid crystal layer 4 includes a liquid crystal material (liquid crystal substance) and a chiral material. This liquid crystal material includes a lot of liquid crystal molecules, and has negative dielectric anisotropy $\Delta \in$ and a predetermined chiral pitch length. The liquid crystal material of the technology disclosed herein is not limited to any particular type, and hence a typical liquid crystal material can be used. As in the case of the present embodiment, as a liquid crystal material with the negative dielectric anisotropy $\Delta \in$, it is possible to use MJ941296 (product name) of Merck Ltd. or MLC6690 (product name) of Merck Ltd.

The chiral material is added to impart a predetermined chiral pitch length to the liquid crystal material. While not limited to any particular type, the chiral material of the technology disclosed herein is suitably chosen in consideration of the type of the liquid crystal material and the degree of the chiral pitch length. For example, the chiral material is S-811 (product name) of Merck Ltd. An amount of the added chiral material is suitably determined in consideration of the liquid crystal material and the degree of the chiral pitch length. Details of this will be given later.

Because of the above-described arrangement, the liquid crystal display element 1 of the present embodiment realizes a so-called twisted vertical alignment (TVA) mode in which the liquid crystal molecules falls while being twisted, when an electric field is applied to the liquid crystal layer 4 via the transparent electrode 6 and the transparent electrode 9.

(Pre-Tilt Angle)

The liquid crystal display element 1 of the present embodiment includes the alignment film 7 and the alignment film 10 which have been rubbed as explained above. Therefore, in this liquid crystal display element 1, the liquid crystal molecules are tilted to form a predetermined angle with the surface of the substrate, when no electric field is applied. The angle formed by the longitudinal axis of the liquid crystal molecules and the opposing surface of the first substrate 2 and the second substrate 3 in this case is pre-tilt angle. More specifically, the pre-tilt angle is an initial angle of the director of the liquid crystal molecules with respect to the opposing surfaces of the first substrate 2 and the second substrate 3, when no voltage is applied thereto.

The pre-tilt angle is ideally uniform across the opposing surfaces of the first substrate 2 and the second substrate 3. In reality, however, the liquid crystal molecules with slightly different pre-tilt angles are distributed on the entirety of the surface. In other words, the pre-tilt angles are dispersed on the entirety of the surface of the substrate. This dispersion of the pre-tilt angles indicates that the initial angles (pre-tilt angles) of the director of the liquid crystal molecules are different in the molecule level or near-molecule level (e.g. in an area of about 10 μm in radius).

In the present embodiment, the range of the dispersion of the pre-tilt angles is about $\alpha \pm 3°$, assuming that the median of the pre-tilt angles of the liquid crystal molecules in the display area is $\alpha$. For example, when the alignment film 7 and the alignment film 10 are vertical alignment films, the range is about $87° \pm 3°$. In this case, the pre-tilt angles of the liquid crystal molecules when no voltage is applied fall within the range of 84° to 90°.

A pre-tilt angle can be measured by publicly-known methods. For example, it is possible to perform the measurement by using crystal rotation. The outline of a specific measurement principle is as follows. First, a test panel is disposed between two polarizing plates. A laser beam is applied thereto while the test panel is rotated. As a result, it is possible to measure an amount of light which passes through an analyzer while the incident angle of the light is varied. A pre-tilt angle is measured by performing the curve fitting of obtained rotative angle and transmittance of the test panel by using 2×2 matrix. The measurement of pre-tilt angle may be performed by other methods.

(Amount of Chiral Material to be Added)

The chiral material forms a twisted structure with neighboring molecules in the liquid crystal material. As a result, the energy of interaction between the molecules in the liquid crystal material is decreased and hence the liquid crystal material becomes to spontaneously have a twisted structure and to be steady in this state. It is therefore possible to change the chiral pitch length of the liquid crystal material by adjusting an amount of the chiral material to be added.

In the present embodiment, an amount of the chiral material to be added is adjusted so that the chiral pitch length falls within a predetermined range. Specifically, the range of the chiral pitch length is arranged so that d/p satisfies $0.25 \leq d/p \leq 0.50$, assuming that the thickness of the liquid crystal layer 4 (thickness of a material layer having dielectric anisotropy; cell thickness) is d and the chiral pitch length of the liquid crystal material constituting the liquid crystal layer 4 is p. In other words, in the liquid crystal display element 1 of the present embodiment, an amount of the chiral material to be added is adjusted so that the chiral pitch length of the liquid crystal material falls within the aforesaid range. As a result of this, the twist of the director of the liquid crystal material while an electric field is applied is successively and gradually changed in the space between the boundary face of the first substrate 2 and the boundary face of the second substrate 3. This makes it possible to smoothly change the alignment of the liquid crystal molecules in response to a change in the electric field on the liquid crystal layer 4. As a result, on the entirety of the substrate surfaces of the liquid crystal display element 1, a variation in an amount of transmitted light (i.e. a variation in transmittance) is restrained and hence the occurrence of display unevenness (irregularity due to rubbing lines) is prevented.

For further suppression of the display unevenness, the range of the d/p, which will be detailed below along with the reason thereof, preferably falls within $0.25 \leq d/p \leq 0.48$, and more preferably falls within $0.28 \leq d/p \leq 0.40$. For even further suppression of the display unevenness, the d/p even more preferably falls within the range of $0.30 \leq d/p \leq 0.35$. When the d/p satisfies $0.28 \leq d/p \leq 0.40$, more preferably $0.30 \leq d/p \leq 0.35$, the chiral pitch length of the liquid crystal material is changed in a preferable range, and hence it is possible to obtain a liquid crystal display element which can display high-quality images with no display unevenness.

The measurement of the chiral pitch length of the liquid crystal material can be performed by a publicly-known technique. For example, it can be measured as follows: the chiral pitch length is measured by using helical twisting power (HTp) which is represented by $HTp=1/pc$ assuming that the chiral pitch length is p and an amount of the chiral material to be added is c. While not limited to this, any methods can be used as long as the chiral pitch length is properly measured.

(Retardation)

When d/p falls within the aforesaid range, while a variation in the light transmission with respect to a variation of d/p is restrained and display unevenness (irregularity due to rubbing lines) is prevented, an amount of transmitted light may be decreased depending on the retardation. Such decrease in transmitted light occurs when the retardation is relatively low. Therefore, in such a case, the retardation is increased by, for example, changing the thickness of the liquid crystal layer 4 so that an amount of transmitted light is increased.

The retardation is represented by $\Delta n \times d$ assuming that the thickness of the liquid crystal layer 4 is d and the refractive index anisotropy is $\Delta n$. Although a preferably range of the retardation will be detailed later along with the reason thereof, when d/p falls within the range of $0.25 \leq d/p \leq 0.50$ as in the case of the liquid crystal display element 1 of the present embodiment, the retardation $\Delta n \times d$ preferably falls within the range of $1000 \times d/p \leq \Delta n \times d$. This makes it possible to restrain the decrease in an amount of transmitted light, which occurs when the chiral pitch length of the liquid crystal material is adjusted to restrain the display unevenness.

For further increase in an amount of transmitted light, the aforesaid $\Delta n \times d$ more preferably falls within the following range of $1000 \times d/p + 100 \leq \Delta n \times d$.

The retardation can be measured by a publicly-known technology. For example, it can be measured by a rotating analyzer method as discussed below. FIG. 2 shows measurement by using rotating analyzer. As shown in this figure, a measured object 22 is provided between a polarizer 20 and an analyzer 21, and light is applied thereto from a light source 23. The analyzer 21 is rotated as indicated by the dashed line in FIG. 2, and the retardation is measured based on the light intensity detected by a light receiving section 24. In this case, the retardation (Re) is represented by $Re=(\lambda/\pi)\tan^{-1}(Tc/Tp)^{1/2}$ assuming that the retardation is Re, the wavelength of light is $\lambda$, parallel transmittance is Tp, and orthogonal transmittance is Tc.

The thickness d of the liquid crystal layer 4 can be figured out based on the retardation measured as above. The retardation and the thickness of the liquid crystal layer 4 may be measured by other methods.

(Liquid Crystal Display Element with One-side Rubbing)

Figure 3:
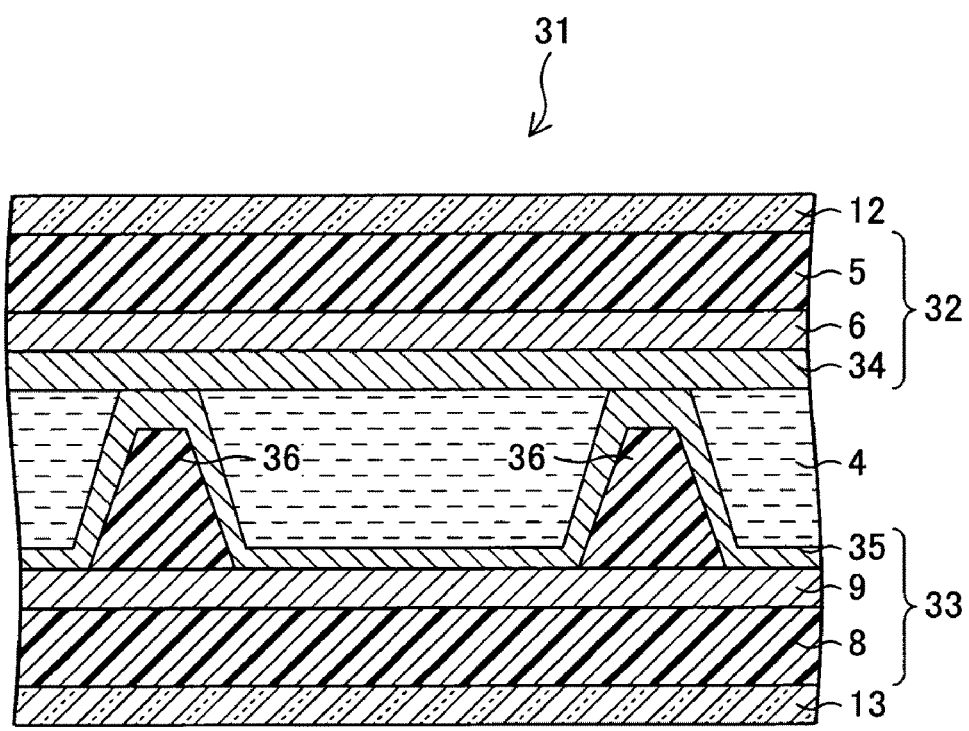
FIG. 3 relates to an example embodiment and is a cross section which outlines the liquid crystal display element.

Now, the following will describe a liquid crystal display element with one-side rubbing, with reference to FIG. 3. For the sake of convenience, components having the same functions as with the components of the liquid crystal display element 1 shown in FIGS. 1 and 2 will be given the same reference numerals, and explanation thereof is omitted. The liquid crystal display element shown in FIGS. 1 and 2 is arranged such that both of the alignment films have been rubbed. On the other hand, in the liquid crystal display element shown in FIG. 3, only one of the alignment films has been rubbed. This arrangement in which only one of the alignment films has been rubbed is termed one-side rubbing.

FIG. 3 is a cross section which outlines the liquid crystal display element 31 with the one-side rubbing. The liquid crystal display element (liquid crystal display cell) 31 shown in FIG. 3 includes a pair of light-transmitting substrates (first substrate 32 and second substrate 33) which are disposed to oppose one another, and has a cell structure such that a liquid crystal layer 4 is sandwiched between the pair of substrates (first substrate 32 and second substrate 33).

The first substrate 32 includes a planar light-transmitting substrate 5 made of a light-transmitting material such as grass, a transparent electrode 6, and an alignment film 34. Similarly, the second substrate 33 includes a planar light-transmitting substrate 8 made of a light-transmitting material such as grass, a transparent electrode 9, and an alignment film 35. The first substrate 32 and the second substrate 33 are jointed with a spacer 36 interposed therebetween, so as to form a single cell.

The alignment film 34 is provided to control the alignment of the liquid crystal molecules so that the longitudinal axis direction of the liquid crystal molecules is substantially orthogonal to the surface (opposing the second substrate 33) of the first substrate 32 (i.e. in the direction closer to the direction orthogonal to the substrate than the direction in parallel to the substrate) when no electric field is applied to the space between the first substrate 32 and the second substrate 33. The alignment film 35 controls the alignment of the liquid crystal molecules so that the longitudinal axis direction of the liquid crystal molecules is orthogonal to the surface (opposing the first substrate 32) of the second substrate 33 when no electric field is applied to the space between the first substrate 32 and the second substrate 33.

The alignment film 34 is formed to cover the entirety of a part of the surface of the first substrate 32, on which part the transparent electrode 6 is formed. The alignment film 35 is formed to cover the entirety of a part of the surface of the second substrate 33, on which part the transparent electrode 9 and the spacer 36 are formed. In short, the alignment film 34 and the alignment film 35 are formed so as to oppose each other.

In the liquid crystal display element 31 shown in FIG. 3, the spacer 36 is, for example, a resin column spacer formed on a color filter. This spacer 36 is formed in such a way that a photosensitive resin is provided on a color filter and photolithography is conducted thereto. The alignment film 35 is applied onto this spacer 36 (resin column spacer). In other words, the alignment film 35 is formed so as to entirely cover the surfaces of the transparent electrode 9 and the spacer 36, and hence the alignment film 35 is not flat but has an irregular surface. Therefore, when the alignment film 35 is rubbed, rubbing lines are wide and hence irregularity in image display is conspicuous. For this reason, in the present embodiment, only the alignment film 34 is rubbed. It is noted that the alignment films 34 and 35 may be identical with those of the liquid crystal display element 1 shown in FIG. 1.

On the outer sides of the first substrate 32 and the second substrate 33, i.e. on the surfaces opposite to the opposing surfaces of the substrates 32 and 33, a polarizing plate 12 and a polarizing plate 13 are provided, respectively. The polarizing plate 12 is disposed so that the polarization axis thereof is in parallel to the rubbing direction of the rubbing of the alignment film 34. The polarizing plate 13 is disposed so that the polarization axis thereof is substantially orthogonal to the rubbing direction of the alignment film 34. In other words, the polarizing plate 12 and the polarizing plate 13 are disposed so that the polarization axes thereof are substantially orthogonal to each other. The polarizing plates 12 and 13, however, are not necessarily disposed as above.

The liquid crystal layer 4 includes a liquid crystal material and a chiral material. The liquid crystal material and the chiral material may be identical with those of the liquid crystal display element 1 shown in FIG. 1.

Because of the above-described arrangement, the liquid crystal display element 31 shown in FIG. 3 realizes a so-called twisted vertical alignment (TVA) mode in which the liquid crystal molecules falls while being twisted, when an electric field is applied to the liquid crystal layer 4 via the transparent electrode 6 and the transparent electrode 9.

(Pre-Tilt Angle, Amount of Chiral Material to Be Added, and Retardation)

The liquid crystal display element 31 shown in FIG. 3 includes the alignment film 34 which has been rubbed as explained above. Therefore, in this liquid crystal display element 31, the liquid crystal molecules are tilted to form a predetermined angle with the surface of the substrate, when no electric field is applied. In the liquid crystal display element 31 shown in FIG. 3, only the alignment film 34 has been rubbed. Therefore the liquid crystal molecules are tilted only with respect to the surface of the first substrate 32.

The range of the dispersion of the pre-tilt angles with respect to the surface of the first substrate 32 is about $\alpha \pm 3°$, assuming that the median of the pre-tilt angles of the liquid crystal material in the display area is $\alpha$. For example, when the alignment films 34 and 35 are vertical alignment films, the range is about $87° \pm 3°$ with respect to the first substrate 32, and the alignment with respect to the second substrate 33 is vertical ($90°$). That is to say, in the liquid crystal layer 4, the pre-tilt angles of the liquid crystal molecules when no voltage is applied fall within the range of $84°$ to $90°$.

In the liquid crystal display element 31 shown in FIG. 3, an amount of the chiral material to be added is adjusted so that the chiral pitch length falls within a predetermined range. Specifically, the range of the chiral pitch length is arranged so that d/p satisfies $0.25 \leq d/p \leq 0.50$, preferably $0.25 \leq d/p \leq 0.48$, assuming that the thickness of the liquid crystal layer 4 (thickness of a material layer having dielectric anisotropy; cell thickness) is d and the chiral pitch length of the liquid crystal material constituting the liquid crystal layer 4 is p.

In this case, also in the liquid crystal display element 31 shown in FIG. 3, as in the case of the liquid crystal display element 1 shown in FIG. 1, the twist of the director of the liquid crystal material while an electric field is applied is successively and gradually changed in the space between the boundary face of the first substrate 32 and the boundary face of the second substrate 33. It is therefore possible to prevent the occurrence of display unevenness (irregularity due to rubbing lines).

(Basis for Amount of Chiral Material to Be Added (Chiral Pitch Length) and Range of Retardation)

Figure 4:
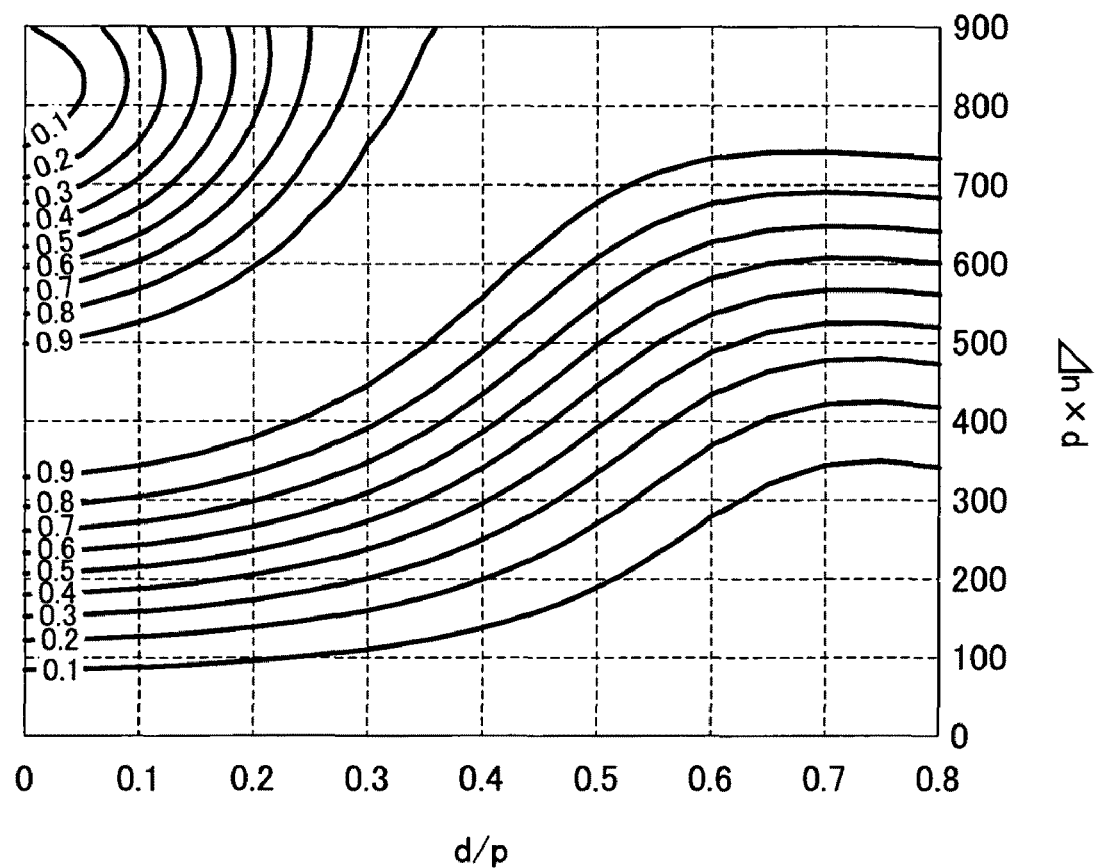
FIG. 4 relates to an example embodiment and is a graph showing the relationship between d/p and Δnd in a liquid crystal display element in which both of the alignment films have been rubbed.
Figure 5:
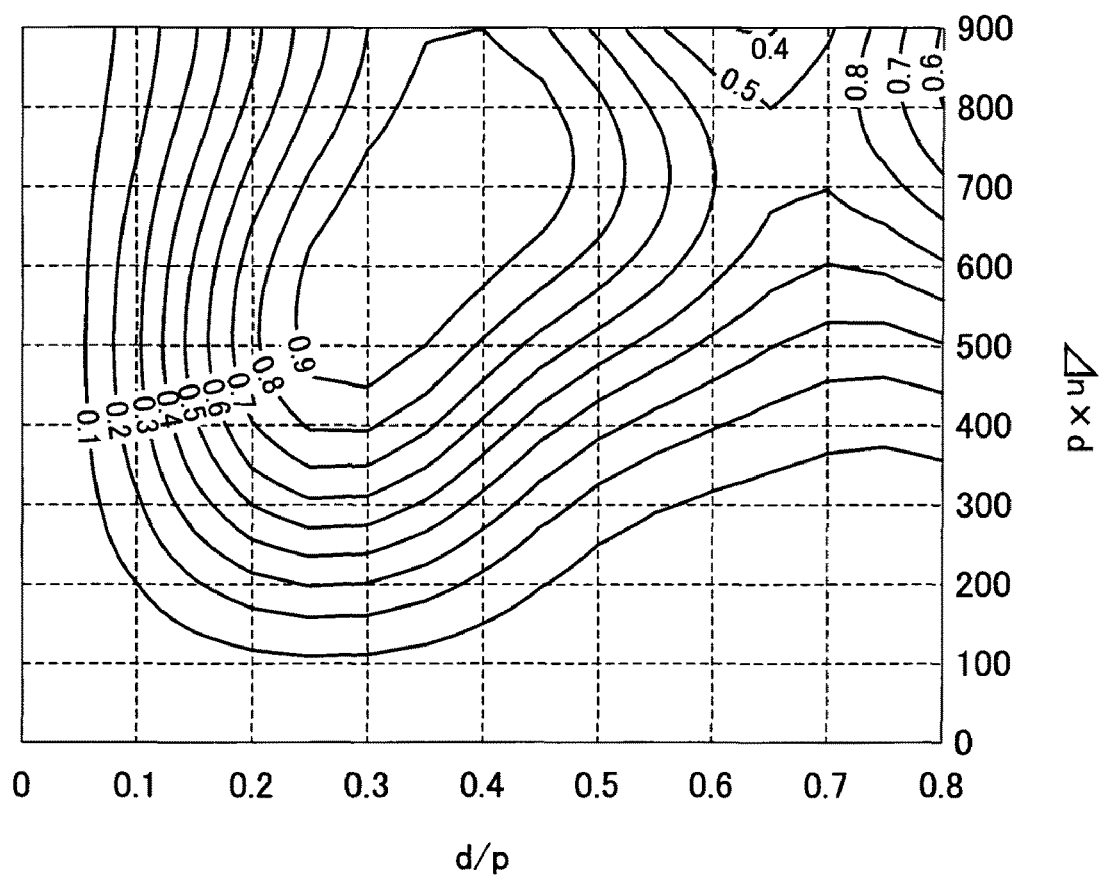
FIG. 5 relates to an example embodiment and is a graph showing the relationship between d/p and Δnd in a liquid crystal display element in which only one of the alignment films has been rubbed.
Figure 6:
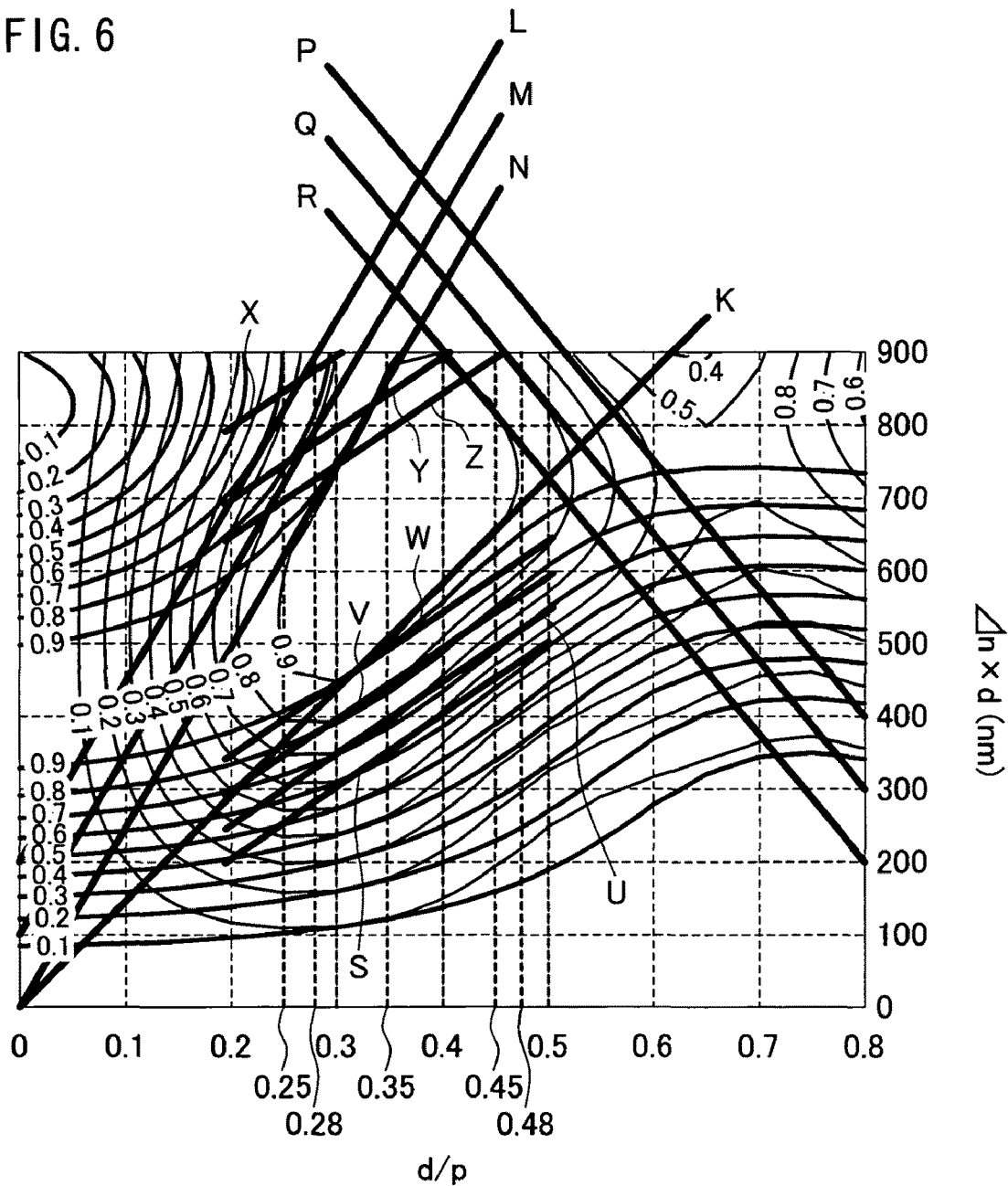
FIG. 6 relates to an example embodiment and is a graph in which the graphs of FIGS. 4 and 5 are superposed.
Figure 7:
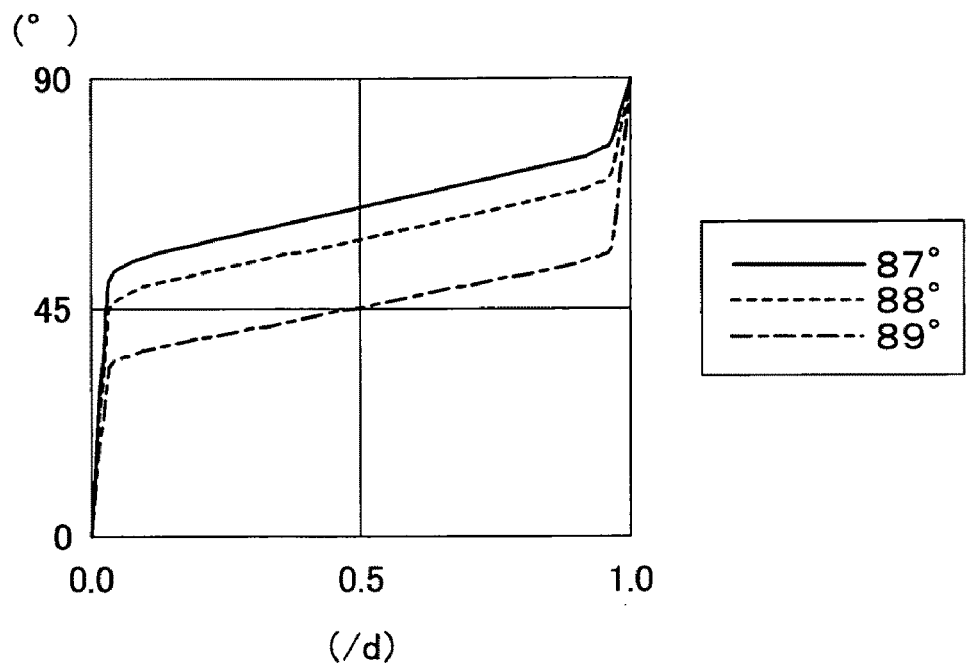
FIG. 7 is a graph showing the relationship between /d and the azimuth of the director in liquid crystal molecules of a conventional liquid crystal display element.
Figure 8:
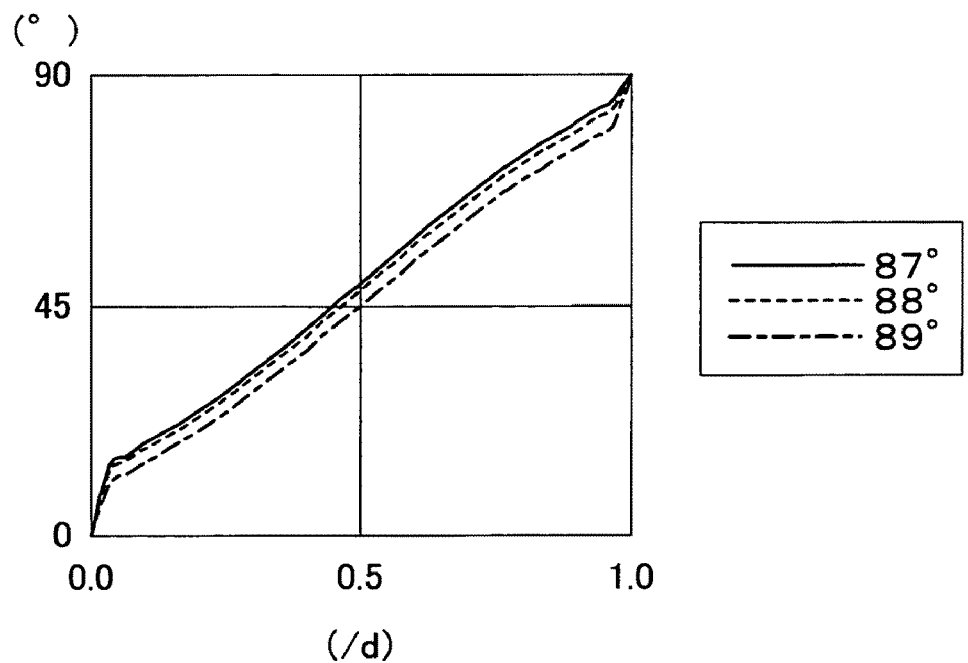
FIG. 8 is a graph showing the relationship between /d and the azimuth of the director in liquid crystal molecules of a liquid crystal display element of an example embodiment.
Figure 9:
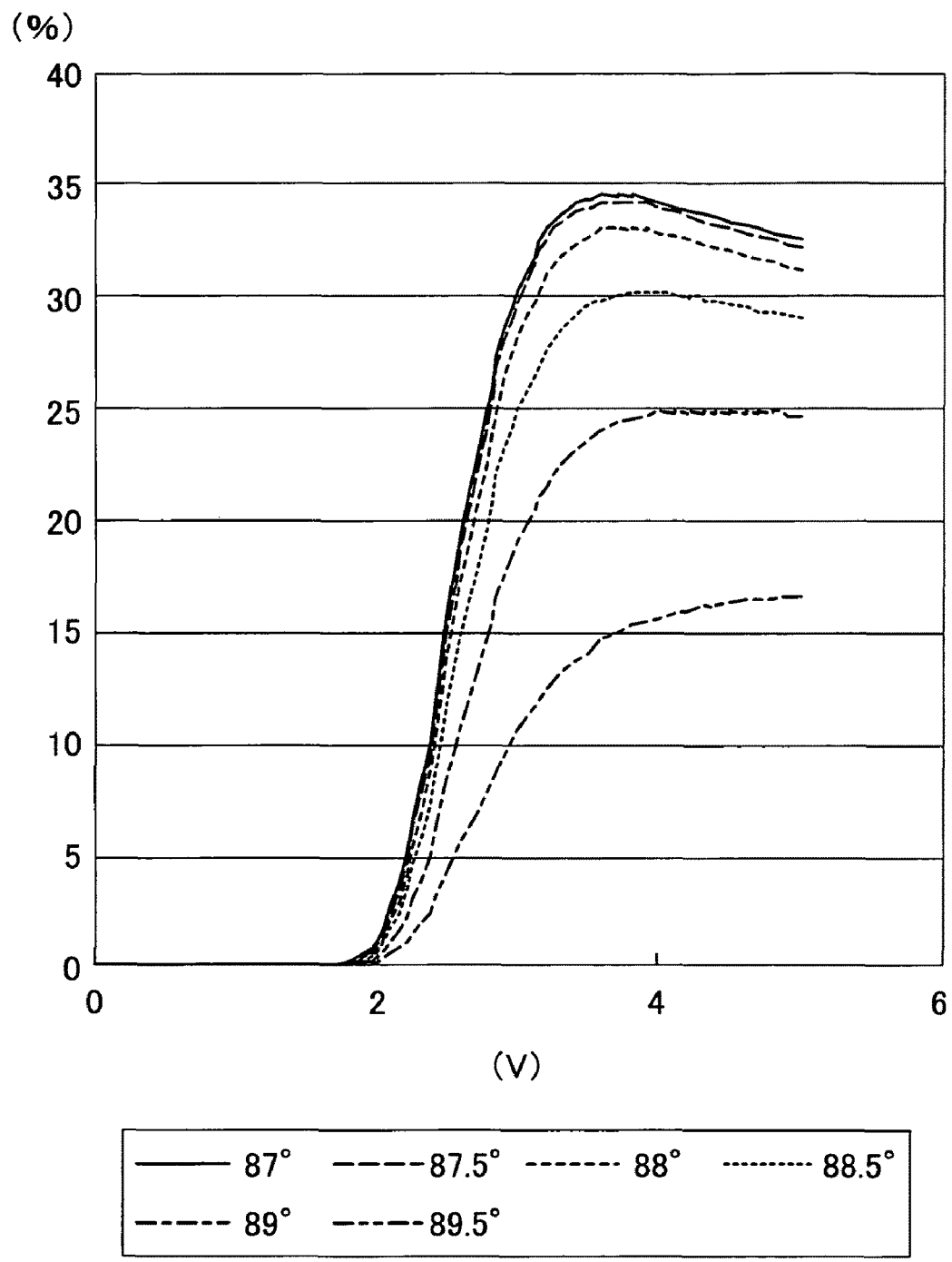
FIG. 9 is a graph showing the relationship between a voltage and light transmittance in a conventional liquid crystal display element.

Now, referring to FIGS. 4 through 6, the following will explain why, in the liquid crystal display element 1 shown in FIG. 1 and the liquid crystal display element 31 shown in FIG. 3, the d/p and $\Delta n \times d$ preferably fall within the aforesaid ranges (i.e. why good display quality is achievable no matter whether the liquid crystal display element is one-side rubbed or both-side rubbed, when the d/p and $\Delta n \times d$ fall within the aforesaid ranges). FIG. 4 is a graph showing the light transmittance of the liquid crystal display element 1 in which both of the alignment films 7 and 10 of the pair has been rubbed. In the graph, the light transmittance is indicated in contour. FIG. 5 is a graph showing the light transmittance of the liquid crystal display element 31 in which only the alignment film 34 of the pair has been rubbed. In the graph, the light transmittance is indicated in contour. FIG. 6 shows that the graphs of FIGS. 4 and 5 are superposed. The horizontal axis indicates d/p, whereas the vertical axis indicates $\Delta n \times d$(nm). The maximum of the light transmittance is 1 (100%), whereas the minimum is 0 (0%). The preferable ranges of the d/p and $\Delta n \times d$ are determined in consideration of display unevenness and light transmittance.

(Display Unevenness)

In regard to the display unevenness, as shown in FIGS. 4 through 6, in case where the light transmittance of the liquid crystal display element 1 in which both of the alignment film have been rubbed and the light transmittance of the liquid crystal display element 31 in which only one of the alignment films has been rubbed are measured and compared with one another, an area in each of the liquid crystal display elements 1 and 31, where a variation in the light transmittance is small, is considered as an area which is free from display unevenness because the dispersion in the light transmittance due to the dispersion in the pre-tilt angles is small (i.e. a variation in an amount of transmitted light is small) in that area. Therefore, the aforesaid ranges are determined in consideration of the area in each of the liquid crystal display elements 1 and 31, where a variation in the light transmittance is small.

First, the range of d/p will be discussed. As shown in FIGS. 4 through 6, in both of the liquid crystal display element 1 in which both of the alignment films have been rubbed and the liquid crystal display element 31 in which only one of the alignment films has been rubbed, an area where a variation in the light transmittance is small is an area where the light transmittance is not lower than 0.9 (i.e. an area circumscribed by the contour indicating 0.9, where the light transmittance is the highest). In areas other than this, the degree of variation in the light transmittance is different between the liquid crystal display elements 1 and 31. Therefore, a variation in the light transmittance is small and the display unevenness (irregularity due to rubbing lines) on account of the dispersion of the pre-tilt angles is prevented, in case where the d/p falls within the range of $0.25 \leq d/p \leq 0.50$, preferably $0.25 \leq d/p \leq 0.48$.

By setting the d/p to fall within $0.28 \leq d/p \leq 0.45$, more preferably $0.28 \leq d/p \leq 0.40$, and even more preferably $0.30 \leq d/p \leq 0.40$, it is possible to further reduce a variation in the light transmittance of each of the liquid crystal display elements 1 and 31 in response to a variation in the d/p. By setting the d/p to fall within $0.30 \leq d/p \leq 0.35$, it is possible to even further reduce a variation in the light transmittance of each of the liquid crystal display elements 1 and 31 in response to a variation in the d/p.

In other words, by adding the chiral material so as to cause the d/p to fall within the aforesaid range, it is possible to consecutively and gradually change the twist of the director of the liquid crystal molecules for 90°, when an electric field is applied. This makes it possible to smoothly change the alignment of the liquid crystal molecules in response to a change in electric field. A retardation difference on account of the dispersion in the pre-tilt angles is compensated by the aforesaid smooth change in the alignment of the liquid crystal molecules, and hence the dispersion in the retardation is spontaneously compensated among the liquid crystal molecules. As a result, a variation in an amount of transmitted light on account of the dispersion in the pre-tilt angles is restrained, and hence the display unevenness is restrained in a liquid crystal display element having dispersed pre-tilt angles.

As described above, it is preferable that d/p falls within the aforesaid range, for the sake of further improvement in the display unevenness. It is noted that the preferable range of the d/p is determined in consideration of both the display unevenness and the light transmission, because the d/p also relates to the light transmittance discussed below. The following will explain the preferable ranges of the d/p and $\Delta$nd additionally in consideration of the light transmittance.

(Light Transmittance)

Typically, the light transmission is preferably not less than 0.6 (60%) in order to achieve good display quality of the liquid crystal display element. When d/p falls within the aforesaid range ($0.25 \leq d/p \leq 0.50$), the tangent line of each contour line is steep in case where d/p is high, as compared to a case where d/p is low. Therefore, the range of variation in the light transmission with respect to the variation of $\Delta n \times d$ is wide in this case, and the range of $\Delta n \times d$ with which light transmission of not lower than 0.6, preferably not lower than 0.7, and more preferably not lower than 0.8 is narrow.

Therefore, to attain the light transmittance in both of the liquid crystal display elements 1 and 31, d/p preferably falls within the range of, as shown in FIG. 6, $0.25 \leq d/p \leq 0.48$, more preferably $0.28 \leq d/p \leq 0.45$, and even more preferably $0.28 \leq d/p \leq 0.40$. Comparing the liquid crystal display elements 1 and 31 in the ranges of the d/p and $\Delta$nd with which the same light transmission is obtained, the ranges are typically narrower in the liquid crystal display element 31. Therefore, from the viewpoint of the light transmittance, the ranges of the d/p and $\Delta$nd are determined mainly in consideration of the properties of the liquid crystal display element 31.

As shown in FIG. 6, when d/p falls within the range of $0.30 \leq d/p \leq 0.40$, the range of $\Delta n \times d$ with which the light transmission is not lower than 0.9 is significantly wide as compared to the case where d/p falls within the range of $0.25 \leq d/p < 0.30$ or $0.40 < d/p \leq 0.50$.

Therefore, when d/p falls within the range of $0.30 \leq d/p \leq 0.40$, a variation (change) in the light transmission in accordance with the variation in $\Delta n \times d$ is effectively restrained.

When d/p falls within the range of $0.30 \leq d/p \leq 0.35$, the variation in the light transmission of the liquid crystal display element 31 is further restrained, and the required thickness d of the liquid crystal layer 4 for achieving the same light transmission when the same liquid crystal material is used is reduced. Therefore, it is further preferable to arrange d/p to fall within the range of not lower than 0.30 and not higher than 0.35.

Therefore, adding a chiral material so as to arrange d/p to fall within the aforesaid range, it is possible to consecutively and gradually twist the director of the liquid crystal molecules for 90°, when an electric field is applied. This makes it possible to smoothly change the alignment of the liquid crystal molecules in response to a change in electric field. In this way, a difference in the retardation, which occurs due to the irregularity in pre-tilt angles, is compensated by the smooth change of the alignment of the liquid crystal molecules, and the dispersion in the retardation is spontaneously compensated among the liquid crystal molecules.

Now, the range of $\Delta n \times d$ is explained. As discussed above, the light transmission is preferably not lower than 0.6 (60%) in order to obtain good display quality of the liquid crystal display element. The range of the retardation is therefore arranged to arrange the light transmission to fall within the aforesaid range.

As shown in FIG. 6, in case where $0.25 \leq d/p \leq 0.50$, the retardation is arranged to satisfy $1000 \times d/p \leq \Delta n \times d$ (above the line S in FIG. 6, which is represented by $1000 \times d/p = \Delta n \times d$) in order to cause the light transmission of the liquid crystal display element 31 to be not lower than 0.6. In this liquid crystal display element 31, when the retardation is set so as to fall within the aforesaid range, display unevenness on account of variation in the pre-tilt angles is prevented and proper brightness is obtained, and hence good display quality is achieved.

When the light transmission is in more preferable ranges, i.e. not lower than 0.7 (70%), further preferably not lower than 0.8 (80%), and even more preferably not lower than 0.9 (90%), brighter image display is feasible and hence the display quality is further improved.

As shown in FIG. 6, in case where $0.25 \leq d/p \leq 0.50$, the retardation with which the light transmission of the liquid crystal display element 31 is not lower than 0.7 is $1000 \times d/p + 100 \leq \Delta n \times d$ (i.e. above the line V in FIG. 6, which is represented by $1000 \times d/p + 100 = \Delta n \times d$). The retardation with which the light transmission is not lower than 0.8 is $1000 \times d/p + 150 \Delta n \times d$ (i.e. above the line W in FIG. 6, which is represented by $1000 \times d/p + 100 = \Delta n \times d$). The retardation with which the light transmission is not lower than 0.9 is $1000 \times d/p + 150 \leq \Delta n \times d$ (i.e. above the lien W in FIG. 6, which is represented by $1000 \times d/p + 150 = \Delta n \times d$). In these cases, display unevenness due to the dispersion in the pre-tilt angles is prevented and bright image display is achieved, and hence good image display quality is obtained.

As shown in FIG. 6, when $0.25 \leq d/p \leq 0.50$ (more preferably the lower limit of d/p is 0.28, still more preferably 0.3, and the upper limit is more preferably 0.45), the retardation of the liquid crystal display element 31 is $1500 \times d/p \leq \Delta n \times d$ (i.e. above the line K in FIG. 6, which is represented by $1500 \times d/p = \Delta n \times d$). With this, it is possible to ensure the light transmission of not lower than 0.9.

The liquid crystal display element 31 has high transmittance in short wavelengths. As shown in FIG. 6, when $0.25 \leq d/p \leq 0.50$, the light transmission of the liquid crystal display element 31 when the retardation is high is sufficient for achieving good image display quality. The upper limit of the retardation of the liquid crystal display element 31 is therefore not particularly limited. However, as shown in FIG. 6, it is preferable to set not only the minimum ($1000 \times d/p \leq \Delta n \times d$) but also the maximum of the retardation, in order to restrain the decrease in an amount of transmitted light due to the increase in the retardation.

More specifically, for example, as shown in FIG. 6, in case where $0.25 \leq d/p \leq 0.50$, the retardation of the liquid crystal display element 31 is set so as to be $\Delta n \times d \leq 2500 \times d/p + 150$ (i.e. below the line P in FIG. 6, which is represented by $\Delta n \times d = 2500 \times d/p + 150$) and $\Delta n \times d \leq -1750 \times d/p + 1750$ (i.e. below the line L in FIG. 6, which is represented by $\Delta n \times d = -1750 \times d/p + 1750$). This makes it possible to achieve the light transmission of not lower than 0.7.

In case where $0.25 \leq d/p \leq 0.50$, the retardation is set so as to be $\Delta n \times d \leq 2500 \times d/p + 100$ (i.e. below the line Q in FIG. 6, which is represented by $\Delta n \times d = 2500 \times d/p + 100$) and $\Delta n \times d \leq -1750 \times d/p + 1700$ (i.e. below the line M in FIG. 6, which is represented by $\Delta n \times d = -1750 \times d/p + 1700$). This makes it possible to achieve the light transmission of not lower than 0.8.

In case where $0.25 \leq d/p \leq 0.50$, the retardation is set so as to be $\Delta n \times d 2500 \times d/p$ (i.e. below the line R in FIG. 6, which is represented by $\Delta n \times d = 2500 \times d/p$) and $\Delta n \times d \leq -1750 \times d/p + 1600$ (i.e. below the line N in FIG. 6, which is represented by $\Delta n \times d = -1750 \times d/p + 1600$). This makes it possible to achieve the light transmission of not lower than 0.9.

In this manner, the upper limit of the retardation of the liquid crystal display element 31 is set so that the decrease in the light transmission due to excessively high retardation is surely prevented, and hence proper brightness is achieved. The arrangement above further restrain the decrease in the display quality and hence makes it possible to obtain good display quality.

As discussed above, when $0.25 \leq d/p \leq 0.50$, the light transmission of the liquid crystal display element 31 when the retardation is high is sufficient to achieve good image display quality. However, when the retardation of the liquid crystal display element 31 exceeds 900 nm, problems in hue (coloration) and contrast may occur.

The retardation of the liquid crystal display element 31 is preferably not higher than 900 nm. It is possible to eliminate the problems in hue (coloration) and contrast as well as obtain the aforesaid light transmission by setting the retardation of the liquid crystal display element 31 to be not higher than 900 nm, in addition to the above-described conditions, and hence good display quality of the liquid crystal display element 31 is achieved.

More simply, as shown in FIG. 6, in case where $0.25 \leq d/p \leq 0.50$, it is possible to ensure the light transmission of not lower than 0.6 and eliminate the problems in hue (coloration) and contrast in the liquid crystal display element 31, by only setting the upper limit of the retardation to be 900 nm. That is to say, in case where $0.25 \leq d/p \leq 0.50$, it is possible to obtain the liquid crystal display element 31 having the aforesaid advantages, by setting the retardation to fall within the range of $1000 \times d/p \leq \Delta n \times d \leq 900$ (i.e. not higher than 900 nm and above the line S in FIG. 6, at which the light transmission of not lower than 0.6 is achieved).

When the upper limit of the retardation is 900 nm, in the range of $0.25 \leq d/p \leq 0.50$, the light transmission of not lower than 0.7 is achieved by setting the lower limit of d/p at 0.28, and the light transmission of not lower than 0.8 is achieved by setting the lower limit of d/p at 0.30.

Also, when the upper limit of the retardation is 900 nm, in the range of $0.25 \leq d/p \leq 0.50$, the light transmission of not lower than 0.8 is achieved by setting the upper limit of d/p at 0.45, and the light transmission of not lower than 0.9 is achieved by setting the upper limit of d/p at 0.40.

In this way, as shown in FIG. 6, the gradient of the contour indicating the light transmission changes when d/p is 0.40, more preferably 0.35.

Therefore, in the range of $0.25 \leq d/p \leq 0.50$, when d/p is not higher than 0.40, more preferably not higher than 0.35, as shown in FIG. 6, it is possible to obtain the light transmission of not lower than 0.7 by setting the retardation of the liquid crystal display element 31 at $\Delta n \times d \leq 2500 \times d/p + 150$ (i.e. below the line P in FIG. 6) and $\Delta n \times d \leq 900$ (nm), it is possible to obtain the light transmission of not lower than 0.8 by setting the retardation at $\Delta n \times d \leq 2500 \times d/p + 100$ (i.e. below the line Q in FIG. 6) and $\Delta n \times d \leq 900$ (nm), and it is possible to obtain the light transmission of not lower than 0.9 by setting the retardation at $\Delta n \times d \leq 2500 \times d/p$ (i.e. below the line R in FIG. 6) and $\Delta n \times d \leq 900$ (nm).

On the other hand, in the range of $0.25 \leq d/p \leq 0.50$, when d/p is not lower than 0.40, as shown in FIG. 6, it is possible to obtain the light transmission of not lower than 0.8 by setting the retardation of the liquid crystal display element 31 at $\Delta n \times d \leq -1750 \times d/p + 1700$ (i.e. below the line M in FIG. 6) and $\Delta n \times d \leq 900$ (nm), and it is possible to obtain the light transmission of not lower than 0.9 by setting the retardation at $\Delta n \times d \leq -1750 \times d/p + 1600$ (i.e. below the line N in FIG. 6) and $\Delta n \times d \leq 900$ (nm).

Moreover, as shown in FIG. 6, when $0.25 \leq d/p \leq 0.50$ (more preferably the lower limit of d/p is 0.28, still more preferably 0.3, and the upper limit is more preferably 0.45), the retardation of the liquid crystal display element 31 is $1500 \times d/p \leq \Delta n \times d$ (i.e. above the line K in FIG. 6, which is represented by $1500 \times d/p = \Delta n \times d$), $\Delta n \times d \leq 2500 \times d/p$ (i.e. below the line R in FIG. 6, which is represented by $\Delta n \times d = 2500 \times d/p$), and $\Delta n \times d - 1750 \times d/p + 1600$ (i.e. below the line N in FIG. 6, which is represented by $\Delta n \times d = -1750 \times d/p + 1600$). Preferably, in addition to the conditions above, $\Delta n \times d \leq 900$ nm. With this, it is possible to ensure the light transmission of not lower than 0.9.

To design the liquid crystal display element 31, the retardation with which the light transmission of not lower than 0.6 is obtained can be easily calculated by, for example, using the equation ($\Delta n \times d = 1000 \times d/p + \alpha$) which is used for specifying the lower limit of the retardation. This makes it possible to calculate the upper limit of the retardation by simply adding a predetermined constant $\alpha$ to a calculated lower limit of the retardation.

In this case, for example, as shown in FIG. 6, in the range of $0.25 \leq d/p \leq 0.50$, the light transmission of not lower than 0.6 is achieved in the liquid crystal display element 31 by setting the retardation at $\Delta n \times d \leq 1000 \times d/p + 600$ (i.e. below the line X in FIG. 6, which is represented by $\Delta n \times d = 1000 \times d/p + 600$).

Also, as shown in FIG. 6, in case where $0.25 \leq d/p \leq 0.50$, it is possible to obtain the light transmission of not lower than 0.7 by setting the retardation at $\Delta n \times d \leq 1000 \times d/p + 500$ (i.e. below the line Y in FIG. 6, which is represented by $\Delta n \times d = 1000 \times d/p + 500$), and it is possible to obtain the light transmission of not lower than 0.8 by setting the retardation at $\Delta n \times d \leq 1000 \times d/p + 450$ (i.e. below the line Z in FIG. 6, which is represented by $\Delta n \times d = 1000 \times d/p + 450$).

Therefore, in case where $0.25 \leq d/p \leq 0.50$, it is possible to obtain the light transmission of not lower than 0.6 by setting the retardation at $1000 \times d/p \leq \Delta n \times d 1000 \times d/p + 600$ (i.e. above the line S and below the line X in FIG. 6), it is possible to obtain the light transmission of not lower than 0.7 by setting the retardation at $1000 \times d/p + 50 \leq \Delta n \times d \leq 1000 \times d/p + 500$ (i.e. above the line U and below the line Y in FIG. 6), and it is possible to obtain the light transmission of not lower than 0.8 by setting the retardation at $1000 \times d/p + 100 \leq \Delta n \times d \leq 1000 \times d/p + 450$ (i.e. above the line V and below the line Z in FIG. 6).

Also, as shown in FIG. 6, in case where $0.28 \leq d/p \leq 0.45$, it is possible to obtain the light transmission of not lower than 0.7 by setting the retardation at $\Delta n \times d \leq 1000 \times d/p+600$ (i.e. below the line X in FIG. 6), it is possible to obtain the light transmission of not lower than 0.8 by setting the retardation at $\Delta n \times d \leq 1000 \times d/p+500$ (i.e. below the line Y in FIG. 6), and it is possible to obtain the light transmission of not lower than 0.9 by setting the retardation at $\Delta n \times d \leq 1000 \times d/p+450$ (i.e. below the line Z in FIG. 6).

Therefore, in case where $0.28 \leq d/p \leq 0.45$, for example, it is possible to obtain the light transmission of not lower than 0.7 by setting the retardation at $1000 \times d/p+50 \leq \Delta n \times d \leq 1000 \times d/p+600$ (i.e. above the line U and below the line X in FIG. 6), it is possible to obtain the light transmission of not lower than 0.8 by setting the retardation at $1000 \times d/p+100 \leq \Delta n \times d \leq 1000 \times d/p+500$ (i.e. above the line V and below the line Y in FIG. 6), and it is possible to obtain the light transmission of not lower than 0.9 by setting the retardation at $1000 \times d/p+150 \leq \Delta n \times d 1000 \times d/p+450$ (i.e. above the line W and below the line Z in FIG. 6).

Also, as shown in FIG. 6, in case where $0.28 \leq d/p \leq 0.40$, it is possible to surely obtain the light transmission of not lower than 0.7 by setting the retardation at $\Delta n \times d \leq 1000 \times d/p+600$ (i.e. below the line X in FIG. 6), it is possible to surely obtain the light transmission of not lower than 0.8 by setting the retardation at $\Delta n \times d \leq 1000 \times d/p+500$ (i.e. below the line Y in FIG. 6), and it is possible to surely obtain the light transmission of not lower than 0.9 by setting the retardation at $\Delta n \times d \leq 1000 \times d/p+450$ (i.e. below the line Z in FIG. 6).

Therefore, in case where $0.28 \leq d/p \leq 0.40$, for example, it is possible to surely obtain the light transmission of not lower than 0.7 by setting the retardation at $1000 \times d/p+50 \leq \Delta n \times d \leq 1000 \times d/p+600$ (i.e. above the line U and below the line X in FIG. 6), it is possible to surely obtain the light transmission of not lower than 0.8 by setting the retardation at $1000 \times d/p+100 \leq \Delta n \times d \leq 1000 \times d/p+500$ (i.e. above the line V and below the line Y in FIG. 6), and it is possible to surely obtain the light transmission of not lower than 0.9 by setting the retardation at $1000 \times d/p+150 \Delta n \times d \leq 1000 \times d/p+450$ (i.e. above the line W and below the line Z in FIG. 6).

Also, as shown in FIG. 6, in the range of $0.30 \leq d/p \leq 0.40$ or in the range of $0.30 \leq d/p \leq 0.35$, it is possible to obtain the light transmission of not lower than 0.8 by setting the retardation at $\Delta n \times d \leq 1000 \times d/p+600$ (below the line X in FIG. 6), it is possible to surely obtain the light transmission of not lower than 0.8 by setting the retardation at $\Delta n \times d \leq 1000 \times d/p+500$ (below the line Y in FIG. 6), and it is possible to surely obtain the light transmission of not lower than 0.9 by setting the retardation at $\Delta n \times d \leq 1000 \times d/p+450$ (below the line Z in FIG. 6).

Therefore, in the range of $0.30 \leq d/p \leq 0.40$ or in the range of $0.30 \leq d/p \leq 0.35$, for example, it is possible to obtain the light transmission of not lower than 0.8 by setting the retardation at $1000 \times d/p+100 \leq \Delta n \times d \leq 1000 \times d/p+600$ (i.e. above the line V and below the line X in FIG. 6), more preferably at $1000 \times d/p+100 \leq \Delta n \times d \leq 1000 \times d/p+500$ (i.e. above the line V and below the line Y in FIG. 6), it is possible to surely obtain the light transmission of not lower than 0.8 by setting the retardation at $1000 \times d/p+150 \leq \Delta n \times d \leq 1000 \times d/p+450$ (i.e. above the line W and below the line Y in FIG. 6), and it is possible to surely obtain the light transmission of not lower than 0.9 by setting the retardation at $1000 \times d/p+150 \leq \Delta n \times d \leq 1000 \times d/p+450$ (i.e. above the line W and below the line Z in FIG. 6).

It is noted that the aforesaid ranges of d/p and $\Delta n \times d$ may be properly combined to achieve a more preferable range.

Example 1

In this example, evaluation was carried out on the display unevenness due to the dispersion of the pre-tilt angles in each of the liquid crystal display elements in which the thickness (cell thickness) d of the liquid crystal layer was arranged to be about 4.90 (4.88 through 4.92). The evaluation was carried out with variously different chiral pitch lengths of the liquid crystal material. Table 1 shows the thickness d of the liquid crystal layer, the chiral pitch p, a value of d/p, and the result of evaluation of the degree of display unevenness.

TABLE 1

| | PANEL NUMBER | | | | | | |
|---|---|---|---|---|---|---|---|
| | 1-1 | 1-2 | 1-3 | 1-4 | 1-5 | 1-6 | 1-7 |
| d(μm) | 4.88 | 4.90 | 4.91 | 4.91 | 4.90 | 4.92 | 4.90 |
| p(μm) | 81 | 18 | 17 | 16 | 13 | 11 | 8 |
| d/p | 0.06 | 0.272 | 0.289 | 0.307 | 0.377 | 0.447 | 0.613 |
| DEGREE OF DISPLAY UNEVENNESS | D | C | B | A | B | C | D |

The chiral pitch length of the liquid crystal material was adjusted by changing an amount of chiral material added to the liquid crystal material. In each of the liquid crystal display elements (panel numbers 1-1 through 1-7 in Table 1), the alignment films were RN-783 (product name) of Nissan Chemical Industries, Ltd., the liquid crystal material of the liquid crystal layer was MJ941296 (product name) ($\Delta n=0.0804$, $\Delta\in=-4$) of Merck Ltd., the chiral material added to the liquid crystal layer was S-811 (product name) of Merck Ltd., and the polarizing plates were G1220DU (product name) of Nitto Denko Corporation. The evaluation was conducted at room temperatures.

The evaluation of the display unevenness was carried out as follows: Each of liquid crystal display elements was placed on the backlight, a uniform voltage was applied to electrodes on the entirety of the display screen of the liquid crystal display element so that the liquid crystal molecules of the liquid crystal layer were operated, and then the distribution of brightness (differences in transmittance) of light which passed through the display screen of each liquid crystal display element was observed by human eyes, while an amount of transmitted light of each liquid crystal display element was adjusted. The symbols indicating the degrees of display unevenness in Table 1 are explained in Table 2.

TABLE 2

| | SYMBOLS IN TABLE 1 | | | |
|---|---|---|---|---|
| | D | C | B | A |
| DEGREE OF DISPLAY UNEVENNESS | CLEARLY OBSERVED | VAGUELY OBSERVED | RARELY OBSERVED | NOT OB-SERVED |

As shown in Tables 1 and 2, display unevenness was clearly observed in the liquid crystal display element with the panel number 1-1 (d/p=0.06). In the liquid crystal display element with the panel number 1-2 (d/p=0.272), there was no problem in the display quality even if display unevenness was vaguely observed. In the liquid crystal display element with the panel number 1-3 (d/p=0.289), display unevenness was rarely observed. In this way, the display unevenness was restrained as the d/p increased. In the liquid crystal display element with the panel number 1-4 (d/p=0.309), display unevenness was not observed by human eyes.

In the liquid crystal display element with the panel number 1-5 (d/p=0.377), display unevenness was rarely observed. In the liquid crystal display element with the panel number 1-6 (d/p=0.447), there was no problem in display quality even if display unevenness was vaguely observed. In this way, the display unevenness increased as the d/p was further increased. In the liquid crystal display element with the panel number 1-7 (d/p=0.613), display unevenness was clearly observed by human eyes.

In this way, in the liquid crystal display elements, display unevenness is restrained if the d/p is set so as to fall within a predetermined range.

For evaluating the dispersion of the pretilt angles in the liquid crystal display elements with the panel numbers 1-1 through 1-7, liquid crystal cells for measuring pretilt angles were manufactured. These liquid crystal cells were manufactured in the same process as the liquid crystal display elements with the panel numbers 1-1 through 1-7 so that the cells were identical with the respective liquid crystal display elements with the panel numbers 1-1 through 1-7, except the rubbing directions of the alignment films.

Each of the liquid crystal cells is, for the measurement of the pretilt angles, the rubbing directions of the alignment films on the respective substrates sandwiching the liquid crystal layer were in reverse to each other.

The measurement of the pretilt angles was carried out using PAS-301 (product name) of Toyo Corporation. The measurement of the pretilt angles was carried out in plural parts of the display screen of each liquid crystal display element, and in what range the measured pretilt angles in the display screen of each liquid crystal display element fell was evaluated.

As a result of the evaluation of the pretilt angles, it was found that the pretilt angles of the liquid crystal display elements always fell within the range of θpmax−θpmin≦3.0°, assuming that the maximum pretilt angle was θpmax and the minimum pretilt angle was θpmin.

The cell thickness of each liquid crystal display element was measured using RETS-1200 made by Otsuka Electronics Co. Ltd.

As described above, when, as shown in Tables 1 and 2, d/p was set at around 0.31 in the liquid crystal display elements of this example assuming that the chiral pitch length of the liquid crystal material of the liquid crystal layer was p and the thickness of the liquid crystal layer was d, the display unevenness due to the dispersion of the pretilt angles was restrained and hence uniform and good display characteristics were achieved.

Example 2

In this example, relative transmittance and display unevenness of three liquid crystal display elements in which the chiral pitch length p of the liquid crystal was set at P=20, P=18, and P=12, respectively, were evaluated, with the thickness d of the liquid crystal layer being variously changed. Table 3 shows the thickness d of the liquid crystal layer, the chiral pitch p, values of d/p and Δn×d, and the result of evaluation of the relative transmittance and display unevenness.

TABLE 3

| | PANEL NUMBER | | |
|---|---|---|---|
| | 2-1 | 2-2 | 2-3 |
| d(μm) | 6.25 | 5.55 | 3.70 |
| p(μm) | 20 | 18 | 12 |
| d/p | 0.313 | 0.308 | 0.308 |
| Δn × d(nm) | 503 | 446 | 297 |
| RELATIVE TRANSMITTANCE | 1.12 | 1.00 | 0.65 |
| DEGREE OF DISPLAY UNEVENNESS | A | A | A |

In each of the liquid crystal display elements (with the panel numbers 2-1 through 2-3 shown in Table 3), the alignment films were RN-783 (product name) of Nissan Chemical Industries, Ltd., the liquid crystal material of the liquid crystal layer was MJ941296 (product name) (Δn=0.0804, Δ∈=−4) of Merck Ltd., the chiral material added to the liquid crystal layer was S-811 (product name) of Merck Ltd., and the polarizing plates were G1220DU polarizing plate (product name) of Nitto Denko Corporation. The evaluation was conducted at room temperatures.

The transmittance was measured in such a manner that a light amount T0 of the backlight which was the light source was measured, and then a light amount T1 of light passing through each of the liquid crystal display elements on the backlight was measured. In this case, the transmittance (T) was defined as T=T1/T0.

In Table 3, a relative transmittance calculated by dividing the transmittance of each liquid crystal display element by the transmittance of the liquid crystal display element with the panel number 2-2 is shown.

As shown in Table 3, a comparison between the liquid crystal display element with the panel number 2-2 and the liquid crystal display element with the panel number 2-1 shows that, while d/p was close to 0.31 in both panels, the transmittance of the liquid crystal display element with the panel number 2-1 (Δn×d=503 nm) was higher by around 12% than the transmittance of the liquid crystal display element with the panel number 2-2 (Δn×d=446 nm).

Similarly, in a comparison between the liquid crystal display element with the panel number 2-2 and the liquid crystal display element with the panel number 2-3, while d/p was close to 0.31 in both panels, the transmittance of the liquid crystal display element with the panel number 2-3 (Δn×d=297 nm) was lower by around 35% than the transmittance of the liquid crystal display element with the panel number 2-2 (Δn×d=446 nm).

In all of the liquid crystal display elements with the panel numbers 2-1, 2-2, and 2-3, no display unevenness was observed and the degree of display unevenness was low.

In this way, as shown in Table 3, high transmittance and restrained display unevenness were achieved in the liquid crystal display element of the example 2, by setting d/p≈0.31 and Δn×d≈503.

Embodiment 2

The following will describe another example embodiment with reference to FIG. 10, FIG. 11(a), FIG. 11(b), and FIG. 11(c). In the present example embodiment, components having the same functions as with the Embodiment 1 will be given the same reference numerals, and explanation thereof is omitted. The technology disclosed herein will deal with differences from Embodiment 1 above.

As discussed above, no matter whether both-side rubbing or one-side rubbing is adopted, a variation in the light transmittance due to the dispersion in the pretilt angles is compensated and overall display unevenness on the display surface is restrained by optimizing the d/p. However, when the overall display unevenness is restrained (improved), minor partial irregularity, which has been unnoticed, becomes conspicuous. Such partial display unevenness is observed along the source lines or gate lines. Partial display unevenness is not very conspicuous for human eyes observing the entire display screen, but is found when each pixel is magnified by an electron microscope or the like.

The present embodiment therefore deals with a liquid crystal display element in which not only the overall display unevenness on the display screen is restrained (improved) but also partial irregularity observed along the source lines or gate lines, which occurs on account of the suppression (improvement) of the overall display unevenness, is restrained. It is noted that, although the discussion below deals with a liquid crystal display element 1 with both-side rubbing, the present invention is not limited to this arrangement.

Figure 10:
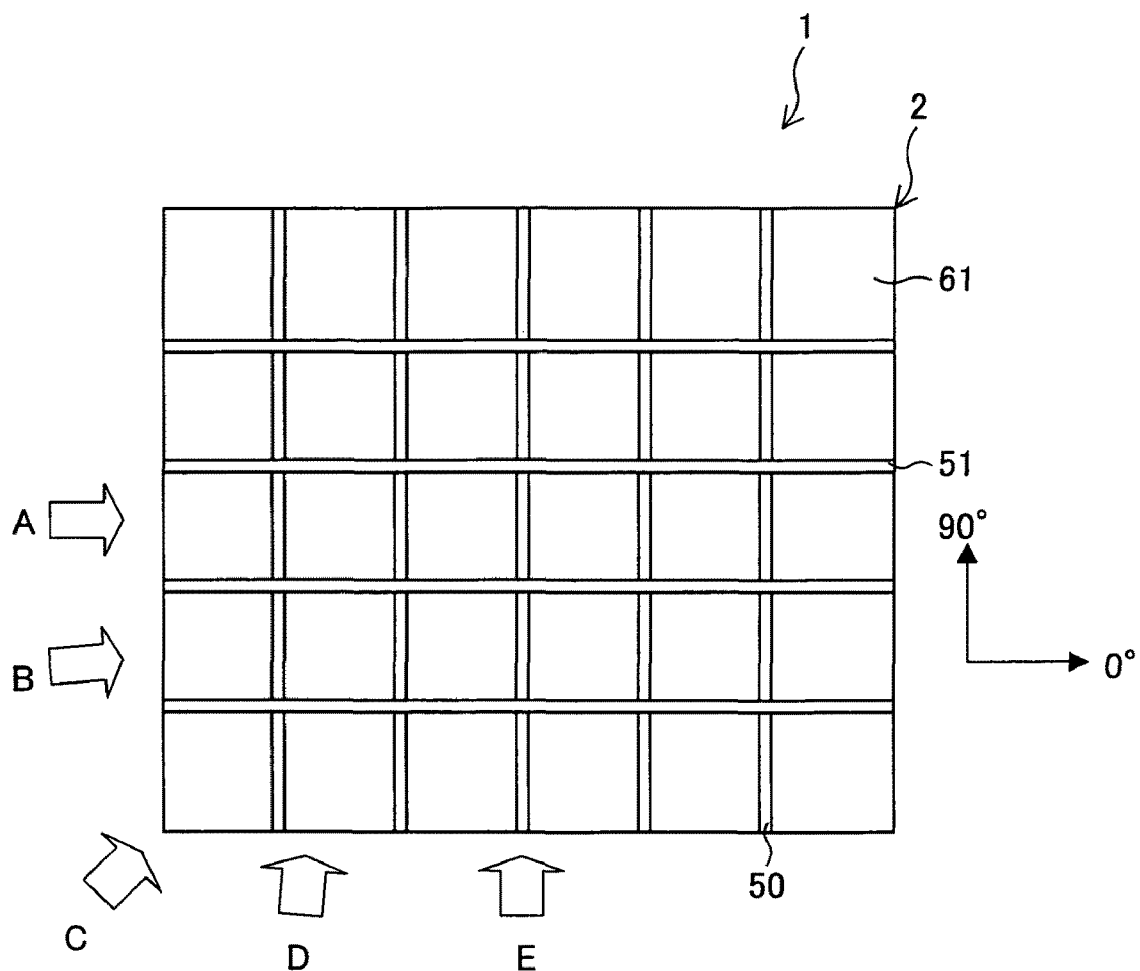
FIG. 10 is a plan view of an active matrix substrate, which shows the direction of rubbing.
Figure 11A:
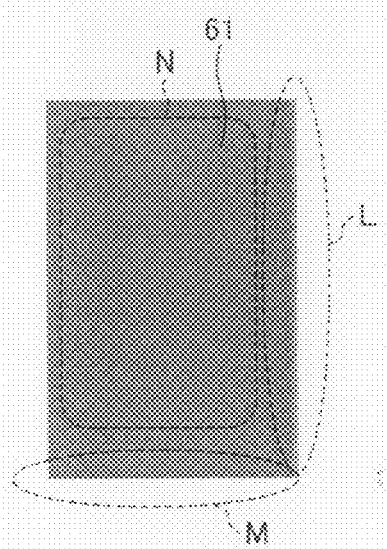
FIG. 11(a) is a conceptual diagram showing how transmittance in a pixel is different when the direction of rubbing is different.
Figure 11B:
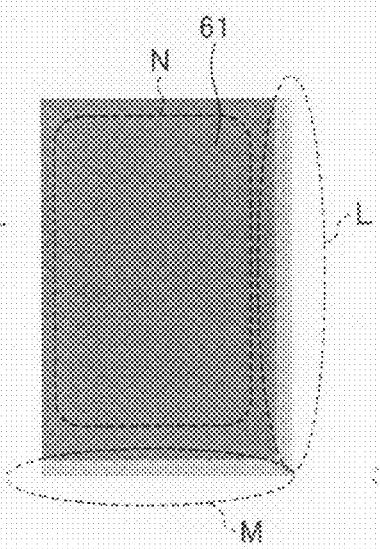
FIG. 11(b) is a conceptual diagram showing how transmittance in a pixel is different when the direction of rubbing is different.
Figure 11C:
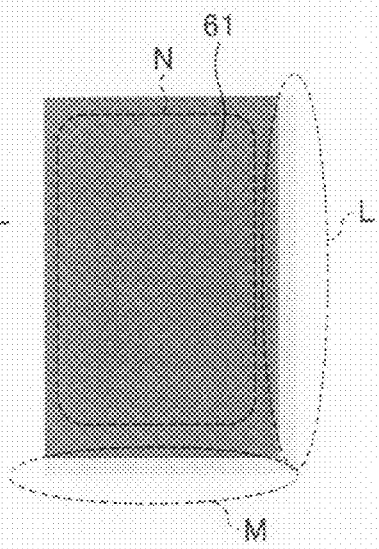
FIG. 11(c) is a conceptual diagram showing how transmittance in a pixel is different when the direction of rubbing is different.

The liquid crystal display element 1 of the present embodiment, which is shown in FIG. 10, is different from the liquid crystal display element 1 of Embodiment 1 in that the first substrate is an active matrix substrate and the rubbing direction is in parallel to the source lines 50 or the gate lines 51. This rubbing in parallel to the source lines 50 or the gate lines 51 makes it possible to prevent, as discussed above, the partial irregularity observed along the source lines or gate lines. The rubbing direction, however, is not necessarily in parallel to the source lines 50 or the gate lines 51. The smaller the angle between the source lines 50 or the gate lines 51 and the rubbing direction is, the more the partial display unevenness observed along the source lines or the gate lines is restrained. Details are as follows.

The liquid crystal display element 1 of the present embodiment includes a first substrate 2 and a second substrate 3. The first substrate 2 (active matrix substrate) has pixels 61 which are provided in a matrix manner, and each of the pixels 61 is provided with an active element (not illustrated) such as TFT. On the other hand, the second substrate 3 is a color filter substrate, on which a color filter (not illustrated) is formed.

As shown in FIG. 10, the first substrate 2 has vertical source lines 50 and horizontal gate lines 51 which are orthogonal to the source lines 50, respectively. On the first substrate 2, areas which are circumscribed by the source lines 50 and the gate lines 51 are the pixels 61. Both the alignment film 7 on the first substrate 2 which is an active matrix substrate and the alignment film 10 on the second substrate 3 which is a color filter substrate have been rubbed, and the rubbing directions of the first substrate 2 and the second substrate 3 are orthogonal to one another.

(Evaluation Results)

The following will describe the results of evaluation of the liquid crystal display element 1 of Embodiment 2.

More specifically, the following will provide the results of comparisons between the display unevenness of the liquid crystal display element 1 and those of liquid crystal display elements 1 with variously different rubbing directions. In addition to this, the following will also explain the dispersion of pretilt angles and the display unevenness around the wires formed on the first substrate 2 which is an active matrix substrate.

The liquid crystal display element 1 for the evaluation was arranged as below.

The thickness (cell thickness: d) of the liquid crystal layer 4 sandwiched between the first substrate 2 and the second substrate 3 was about 4.90 (4.88 to 4.92) μm. The liquid crystal layer 4 was constituted by a liquid crystal material and a chiral material added to the liquid crystal material. The liquid crystal material was MJ941296 (product name) (Δn=0.0804, Δ∈=−4) of Merck Ltd., and the chiral material was S-811 (product name) also of Merck Ltd. This liquid crystal display element 31 was arranged to have d/p of 0.3.

To the inner surfaces (facing the liquid crystal layer) of the first substrate 2 and the second substrate 3, RN-783 (product name) of Nissan Chemical Industries, Ltd. was applied so that alignment films 7 and 10 were formed thereon.

Both the alignment film 7 on the first substrate 2 which is an active matrix substrate and the alignment film 10 on the second substrate 3 which is a color filter substrate have been rubbed.

For the evaluation, liquid crystal display elements 1 (panels 3-1 through 3-5) with respective rubbing directions as shown in Table 4 were used.

The panel 3-5 was a liquid crystal display element 1 which included an active matrix substrate which was the first substrate 2 rubbed in the direction in parallel to the gate lines 51 (i.e. the direction A in FIG. 10; hereinafter, gate line direction) and a color filter substrate which was the second substrate 3 rubbed in the direction in parallel to the source lines 50 (i.e. the direction E in FIG. 10; hereinafter, source line direction). Provided that the gate line direction was 0° and the direction in parallel to the source lines 50 (i.e. the direction E in FIG. 10; hereinafter, source line direction) was 90°, the panel 3-2 was a liquid crystal display element 1 which included an active matrix substrate which was rubbed in the direction (5° direction; the direction B in FIG. 10) forming an angle of 5° with the gate line direction. Similarly, as liquid crystal display elements 1, the panel 3-3 was rubbed in the 45° direction (the direction C in FIG. 10), the panel 3-4 was rubbed in the 85° direction (the direction D in FIG. 10), and the panel 3-5 was rubbed in the source line direction (the 90° direction; the direction A in FIG. 10), in terms of the rubbing direction of active matrix substrate. As described above, the second substrate 3 is a color filter substrate which has been rubbed in the direction orthogonal to the rubbing direction of the first substrate 2.

To the outer surfaces (which did not face the liquid crystal layer 4) of the first substrate 2 and the second substrate 3, plates of G1220DU (product name) made by Nitto Denko Corporation were attached as polarizing plates 2 and 3.

(Method of Evaluation of Display Unevenness)

The evaluation of the display unevenness was carried out as follows: As shown in Table 4, each of liquid crystal display elements 1 with respective rubbing directions was placed on the backlight, a uniform voltage was applied to electrodes on the entirety of the display screen of the liquid crystal display element 1 so that the liquid crystal molecules of the liquid crystal layer 4 were operated, and then the distribution of brightness (differences in transmittance) of light which passed through the display screen of each liquid crystal display element 1 was observed by human eyes, while an amount of transmitted light of each liquid crystal display element 1 was adjusted.

Also, the inside of the pixel 61 was observed by using a microscope, while the transmittance was fixed at 50%. The results are shown in FIG. 11(*a*) to FIG. 11(*c*). The observation using the microscope was, as shown in FIG. 11(*a*) to FIG. 11(*c*), performed in such a way that, in each pixel constituting the display screen of the liquid crystal display element 1, a difference in the transmittance was observed between (i) an area (L in FIGS. 11(*a*)-11(*c*)) around the long edge and an area (M in FIGS. 11(*a*)-11(*c*)) around the short edge and (ii) the central area (N in FIGS. 11(*a*)-11(*c*)) of the pixel 61. The evaluation was carried out at room temperatures.

TABLE 4

| PANEL | RUB-BING ANGLE | DISPLAY UNEVENNESS | FIGURE OF PIXELS | TILT L AROUND WIRES | TILT M AROUND WIRES |
| --- | --- | --- | --- | --- | --- |
| 3-1 | 0° | A | a | 87.1° | 87.4° |
| 3-2 | 5° | B | b | 85.3° | 85.0° |
| 3-3 | 45° | C | c | 84.2° | 84.1° |
| 3-4 | 85° | B | b | 85.5° | 84.5° |
| 3-5 | 90° | A | a | 87.3° | 86.8° |

(Result of Evaluation)

Table 4 shows the result of the evaluation. In Table 4, each of "A", "B", and "C" indicates the degree of relative display unevenness, and "A" indicates that display unevenness was not observed even by the observation using a microscope. "C" also indicates that while overall display unevenness was restrained, partial display unevenness around the wires was conspicuous as a result of the observation by using a microscope, as compared to the other panels.

Furthermore, in Table 4, figures of pixels a, b, and c indicate the display states of the pixels 61 as a result of the observation by a microscope, and correspond to the pixels 61 of FIG. 11(*a*), FIG. 11(*b*), and FIG. 11(*c*), respectively.

As shown in Table 4, the figure of pixel observed in the panel 3-3 (whose rubbing direction was C in FIG. 10) is shown in FIG. 11(*c*). When the rubbing direction was 45° as in the case of the panel 3-3, no display unevenness was observed at the central part (N) of the pixel, but display unevenness around the wires (in areas L and M) was relatively conspicuous as a result of the observation by a microscope, in comparison with the panels 3-1, 3-2, 3-4, and 3-5.

In the meanwhile, as shown in Table 4, in the panel 3-2 (whose rubbing direction was B in FIG. 10) and the panel 3-4 (whose rubbing direction was D in FIG. 10), the figure of observed pixel was shown in FIG. 11(*b*). In these panels, display unevenness was rarely observed.

In the panel 3-1 (whose rubbing direction was in parallel to the gate line direction) and the panel 3-5 (whose rubbing direction was in parallel to the source line direction), the figures of the observed pixels were shown in FIG. 11(*a*). In these panels, display unevenness was not observed.

In this way, it is possible to understand that the display unevenness in the pixels 61 is meticulously prevented even if both the first substrate 2 and the second substrate 3 have been rubbed, when the rubbing direction in the first substrate 32 is in parallel to the source lines 50 or the gate lines 51.

That is to say, in the liquid crystal display element 1 of the present embodiment, the rubbing has been conducted in the gate line direction or in the source line direction, and hence overall display unevenness of the pixels 61 is restrained. However, when the overall display unevenness is restrained and a clear image is obtained, partial display unevenness around the wires (in areas L and M) becomes conspicuous, although it was not perceptible before. Such partial display unevenness around the wires can be observed by using a microscope as discussed above, and the display quality can be further improved by restraining such partial display unevenness as in the cases of the panels 3-2 and 3-4, preferably as in the cases of the panels 3-1 and 3-5.

(Relationship between Display unevenness and Pretilt angle)

The tilt L around the wires and the tilt M around the wires in Table 4 indicate the pretilt angle around the long edge (i.e. in the area L in FIGS. 11(*a*)-11(*c*)) of the pixel 61 and the pretilt angle around the short edge (i.e. in the area M in FIGS. 11(*a*)-11(*c*)) of the pixel 61, respectively. At the central part (area N in FIGS. 11(*a*)-11(*c*)), of the pixel 61, the pretilt angle was about 87° in all of the panels.

As shown in Table 4, in the display elements 31 (panel 3-1 through panel 3-5) of the present embodiment, a difference (in the pretilt angles in the display screen) between the pretilt angle (87°) at the central part (area N) of the pixel 61 and the pretilt angles (tilts M and L around the wires) around the wires (in the areas L and M) was not larger than ±3° in all of the panels. Also, it has been found from the evaluation result above that the display unevenness correlates with the pretilt angles. In other words, the display unevenness is severe when a difference between the pretilt angles in the display screen is large, whereas the display unevenness is small when a difference between the pretilt angles in the display screen is small.

As described above, the liquid crystal display element of the technology disclosed herein includes: a pair of opposing substrates; and a material layer which is sandwiched between said pair of substrates and has dielectric anisotropy, the material layer having the dielectric anisotropy including a chiral material and a liquid crystal material with a nematic liquid crystal phase, and $0.25 \leq d/p \leq 0.50$ being satisfied assuming that the thickness of the material layer is d and the chiral pitch length of the liquid crystal material is p. The liquid crystal display element can therefore display high-quality images with restrained display unevenness.

The aforesaid liquid crystal display element of the technology disclosed herein Ұ is preferably arranged such that alignment films are formed on the opposing surfaces of said pair of substrates, respectively, and aligning capability is imparted to surfaces of the alignment films in order to cause the liquid crystal material to have pretilt angles.

In the arrangement above, since the aligning capability is imparted to both of the paired substrates, it is possible to broaden the ranges of d/p and Δnd at which a desired light transmittance can be obtained.

The aforesaid liquid crystal display element of the technology disclosed herein is preferably arranged such that $0.28 \leq d/p \leq 0.40$ is satisfied, assuming that the thickness of the material layer is d and the chiral pitch length of the liquid crystal material is p.

The aforesaid liquid crystal display element of the technology disclosed herein is preferably arranged such that $0.30 \leq d/p \leq 0.35$ is satisfied, assuming that the thickness of the material layer is d and the chiral pitch length of the liquid crystal material is p.

In the arrangements above, the chiral pitch length of the liquid crystal material is changed in a preferable range when d/p satisfies $0.28 \leq d/p \leq 0.40$ or $0.30 \leq d/p \leq 0.35$, and hence it is possible to obtain a liquid crystal display element which can display high-quality images without display unevenness.

The aforesaid liquid crystal display element of the technology disclosed herein is preferably arranged such that the liquid crystal material has pretilt angles in areas around respective boundary faces of the substrates, and the range of dispersion of the pretilt angles of the liquid crystal material is, in a display area, ±3° of the median of the pretilt angles. Also, The aforesaid liquid crystal display element of the technology disclosed herein is preferably arranged such that the median of the pretilt angles is 87°.

In the arrangements above, the liquid crystal material in the display area has pretilt angles. A pretilt angle is an angle between the director of the liquid crystal molecules and the surface of the substrate, when no voltage is applied thereto. The liquid crystal material sandwiched between the substrates whose alignment film has been rubbed is aligned not in the same direction but in slightly different directions, when no voltage is applied. In other words, the pretilt angles are dispersed in the whole liquid crystal material. This is a problem inherent in the process, and hence it is difficult to restrain such dispersion.

In the aforesaid liquid crystal display element, the range of dispersion of the pretilt angles falls within ±3° of the median of the pretilt angles of the liquid crystal material in the display area. The pretilt angle may be set at, for example, 87°. In this case, the liquid crystal material is in 87°±3°, and hence $84° \leq \theta p \leq 90°$ is satisfied provided that the pretilt angles are indicated by θp.

In conventional liquid crystal display elements, when the pretilt angles are dispersed as above, it is difficult to avoid a variation in an amount of transmitted light due to the dispersion of the pretilt angles. When the d/p falls within the aforesaid range, the twist of the director of the liquid crystal material successively and gradually changes, and hence a variation in an amount of transmitted light is restrained in the whole substrate surfaces. As a result, it is possible to obtain a liquid crystal display element which can display high-quality images without display unevenness.

The aforesaid liquid crystal display element of the technology disclosed herein is preferably arranged such that $1000 \times d/p \leq \Delta n \times d$ is satisfied assuming that refractive index anisotropy of the liquid crystal material is Δn.

In this arrangement, even if the pretilt angles of the alignment film are dispersed, a variation in an amount of transmitted light due to the dispersion of the pretilt angles of the alignment film is restrained and hence display characteristics with restrained display unevenness are achieved. Furthermore, it is possible to realize a liquid crystal display element in a twisted alignment mode, which excels in light transmission. It is noted that Δn×d indicates so-called retardation, and is, in accordance with the technology disclosed herein, a marker of the brightness of a liquid crystal display element.

As discussed above, when an amount of the chiral material to be added is determined so that d/p falls within the aforesaid range, while a variation in the light transmission is restrained, an amount of transmitted light may be decreased. In such a case, the decrease in an amount of the transmitted light is prevented by arranging the retardation to fall within a predetermined range.

In other words, when the retardation falls within the aforesaid range of $1000 \times d/p \leq \Delta n \times d$ while a variation in an amount of transmitted light is restrained by suitably setting the d/p, the decrease in an amount of transmitted light is also restrained.

The aforesaid liquid crystal display element is preferably arranged such that $1000 \times d/p + 100 \Delta n \times d$ is satisfied assuming that refractive index anisotropy of the liquid crystal material is Δn.

The decrease in an amount of transmitted light is further restrained by arranging the retardation to fall within the range of $1000 \times d/p + 100 \leq \Delta n \times d$.

As a result, it is possible to obtain a liquid crystal display element which can display high-quality images without display unevenness and with suitable brightness.

The aforesaid liquid crystal display element is preferably arranged such that $\Delta n \times d \leq 2500 \times d/p + 150$ and $\Delta n \times d \leq -1750 \times d/p + 1750$ are satisfied.

According to this arrangement, the transmittance of 0.7 is ensured when the d/p satisfies $0.25 \leq d/p \leq 0.50$ and the Δnd satisfies $1000 \times d/p \Delta n \times d$.

The aforesaid liquid crystal display element is preferably arranged such that Δn×d is not higher than 900 nm.

In this arrangement, high transmittance is achieved while the occurrence of problems in hue (coloration) and contrast is restrained.

The aforesaid liquid crystal display element is preferably arranged such that $1500 \times d/p \Delta n \times d$, $\Delta n \times d \leq 2500 \times d/p$, $\Delta n \times d \leq -1750 \times d/p + 1600$, and $\Delta n \times d \leq 900$ nm are satisfied.

In this arrangement, the transmittance of substantially 0.9 is further ensured when the d/p satisfies $0.25 \leq d/p \leq 0.50$ and the Δnd satisfies $1000 \times d/p \leq \Delta n \times d$.

The aforesaid liquid crystal display element is preferably arranged such that the liquid crystal material exerts optical isotropy when no electric field is applied thereto, and the liquid crystal material exerts optical anisotropy when an electric field is applied thereto.

By this arrangement, it is possible to realize a so-called normally-black liquid crystal display element which blocks light when no electric field is applied and lets light pass through when an electric field is applied. On account of very high contrast, a normally-black liquid crystal display element is prone to display unevenness due to a variation in an amount of transmitted light. Such display unevenness can be avoided by the arrangement disclosed herein.

The aforesaid liquid crystal display element is preferably arranged such that between each of the substrates and the material layer, a vertical alignment film which causes the liquid crystal material to have pretilt angles is provided. Also, the aforesaid liquid crystal display element is preferably arranged such that the liquid crystal material is a liquid crystal material with negative dielectric anisotropy.

These arrangements make it possible to obtain a normally-black liquid crystal display element, and hence a liquid crystal display element with high contrast can display high-quality images without display unevenness.

The aforesaid liquid crystal display element is preferably arranged such that at least one of said pair of substrates is an active matrix substrate having source lines, the aligning capability is imparted to a surface of the alignment film on the active matrix substrate, and the aligning capability is imparted by rubbing, and the direction of the rubbing is in parallel to the source lines of the active matrix substrate.

The aforesaid liquid crystal display element is preferably arranged such that at least one of said pair of substrates is an active matrix substrate having gate lines, the aligning capability is imparted to a surface of the alignment film on the active matrix substrate, and the aligning capability is imparted by rubbing, and the direction of the rubbing is in parallel to the gate lines of the active matrix substrate.

This makes it possible to restrain defective image display along the source lines or gate lines, which occurs because there is inescapably an area where the pretilt angles do not fall within the range of ±3° of the median, for the reason that the pretilt angles around the source lines or gate lines are not controllable by a conventional rubbing method (obliquely passing across the wires) due to influences of irregularity in the height of wires or the like.

More specifically, in an active matrix substrate, source lines and gate lines are formed in the vertical direction and in the horizontal direction, respectively. Therefore, in this substrate, the surface of the alignment film thereon is irregular. A conventional rubbing is conducted in the direction forming an angle of substantially 45° with the source lines and gate lines. In other words, the conventional rubbing is conducted to obliquely pass across the source lines and gate lines. In this case, around the source lines or gate lines, it is difficult to set the pretilt angles at a desired angle on account of irregularity in the height of wires or the like, and hence it is difficult to restrain the dispersion within ±3° of the median as above. This is the reason why display unevenness occurs along the source lines or gate lines.

In this regard, in the liquid crystal display element of an example embodiment, the rubbing is conducted in the direction in parallel to the source lines or gate lines. Therefore, an influence of irregularity in the height of wires is small and hence it is easy to control the dispersion of the pretilt angles to be within the range of ±3° of the median of the pretilt angles.

It is therefore possible to restrain the occurrence of display unevenness along the source lines or gate lines, and hence the display quality is further improved.

Examples of methods for ex-post assessment of whether the rubbing has been conducted in a desired direction include a method in which the optical anisotropy of the surface of the alignment film is measured and a method in which the surface is observed using an atomic force microscope (AFM). An example of the equipment for measuring the optical anisotropy is PI-Checker of Toyo Corporation, which is a liquid crystal alignment film evaluation system.

The technology disclosed herein being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The following will specifically describe the present invention with reference to examples and comparative examples. The present invention, however, is not limited to them.

INDUSTRIAL APPLICABILITY

The liquid crystal display element of the technology disclosed herein is a liquid crystal display element in a vertical alignment mode and can restrain the display unevenness. The liquid crystal display element can therefore be widely used for image display apparatuses such as television receivers and monitors and also image display apparatuses of OA equipments such as word processors and personal computers and information terminals such as video cameras, digital cameras, and mobile phones. In this way, the technology disclosed herein is suitably used in various industrial fields requiring displays, such as consumer electronics and mechanical industry.

The invention claimed is:
1. A liquid crystal display element, comprising:
a pair of opposing substrates; and
a material layer which is sandwiched between said pair of substrates and has dielectric anisotropy,
the material layer having the dielectric anisotropy including a chiral material and a liquid crystal material with a nematic liquid crystal phase, and
$0.25 \leq d/p \leq 0.50$ being satisfied assuming that the thickness of the material layer is d and the chiral pitch length of the liquid crystal material is p.
2. The liquid crystal display element as defined in claim 1, wherein, alignment films are formed on the opposing surfaces of said pair of substrates, respectively, and aligning capability is imparted to surfaces of the alignment films in order to cause the liquid crystal material to have pretilt angles.
3. The liquid crystal display element as defined in claim 1, wherein, $0.28 \leq d/p \leq 0.40$ is satisfied.
4. The liquid crystal display element as defined in claim 1, wherein, $0.30 \leq d/p \leq 0.35$ is satisfied.
5. The liquid crystal display element as defined in claim 1, wherein, the liquid crystal material has pretilt angles in areas around respective boundary faces of the substrates, and the range of dispersion of the pretilt angles of the liquid crystal material is, in a display area, ±3° of the median of the pretilt angles.
6. The liquid crystal display element as defined in claim 1, wherein, the median of the pretilt angles is 87°.
7. The liquid crystal display element as defined in claim 1, wherein, $1000 \times d/p \leq \Delta n \times d$ is satisfied assuming that refractive index anisotropy of the liquid crystal material is $\Delta n$.
8. The liquid crystal display element as defined in claim 1, wherein, $1000 \times d/p + 100 \leq \Delta n \times d$ is satisfied assuming that refractive index anisotropy of the liquid crystal material is $\Delta n$.
9. The liquid crystal display element as defined in claim 7, wherein, $\Delta n \times d \leq 2500 \times d/p + 150$ and $\Delta n \times d \leq -1750 \times d/p + 1750$ are satisfied.
10. The liquid crystal display element as defined in claim 1, wherein, $\Delta n \times d$ is not higher than 900 nm.
11. The liquid crystal display element as defined in claim 1, wherein, $1500 \times d/p \Delta n \times d$, $\Delta n \times d \leq 2500 \times d/p$, $\Delta n \times d \leq -1750 \times d/p + 1600$, and $\Delta n \times d \leq 900$ nm are satisfied.
12. The liquid crystal display element as defined in claim 1, wherein, the liquid crystal material exerts optical isotropy when no electric field is applied thereto, and the liquid crystal material exerts optical anisotropy when an electric field is applied thereto.
13. The liquid crystal display element as defined in claim 1, wherein, between each of the substrates and the material layer, a vertical alignment film which causes the liquid crystal material to have pretilt angles is provided.
14. The liquid crystal display element as defined in claim 1, wherein, the liquid crystal material is a liquid crystal material with negative dielectric anisotropy.
15. The liquid crystal display element as defined in claim 1, wherein, at least one of said pair of substrates is an active matrix substrate having source lines,
the aligning capability is imparted to a surface of the alignment film on the active matrix substrate, and the aligning capability is imparted by rubbing, and
the direction of the rubbing is in parallel to the source lines of the active matrix substrate.
16. The liquid crystal display element as defined in claim 1, wherein, at least one of said pair of substrates is an active matrix substrate having gate lines,
the aligning capability is imparted to a surface of the alignment film on the active matrix substrate, and the aligning capability is imparted by rubbing, and
the direction of the rubbing is in parallel to the gate lines of the active matrix substrate.

* * * * *